United States Patent
Xing

(10) Patent No.: US 11,024,846 B2
(45) Date of Patent: Jun. 1, 2021

(54) HIGH ENERGY/POWER DENSITY, LONG CYCLE LIFE, SAFE LITHIUM-ION BATTERY CAPABLE OF LONG-TERM DEEP DISCHARGE/STORAGE NEAR ZERO VOLT AND METHOD OF MAKING AND USING THE SAME

(71) Applicant: ADA Technologies, Inc., Littleton, CO (US)

(72) Inventor: Weibing Xing, Littleton, CO (US)

(73) Assignee: ADA Technologies, Inc., Littleton, CO (US)

(*) Notice: Subject to any disclaimer, the term of this patent is extended or adjusted under 35 U.S.C. 154(b) by 374 days.

(21) Appl. No.: 15/928,840

(22) Filed: Mar. 22, 2018

(65) Prior Publication Data
US 2018/0277830 A1    Sep. 27, 2018

Related U.S. Application Data

(60) Provisional application No. 62/475,655, filed on Mar. 23, 2017.

(51) Int. Cl.
| | |
|---|---|
| H01M 4/485 | (2010.01) |
| H01M 4/131 | (2010.01) |
| H01M 4/62 | (2006.01) |
| H01M 4/525 | (2010.01) |
| H01M 4/505 | (2010.01) |
| H01M 4/66 | (2006.01) |
| H01M 10/0525 | (2010.01) |
| H01M 10/0569 | (2010.01) |
| H01M 10/0567 | (2010.01) |
| H01M 4/36 | (2006.01) |
| H01M 4/04 | (2006.01) |

(52) U.S. Cl.
CPC .......... *H01M 4/485* (2013.01); *H01M 4/131* (2013.01); *H01M 4/366* (2013.01); *H01M 4/505* (2013.01); *H01M 4/525* (2013.01); *H01M 4/628* (2013.01); *H01M 4/661* (2013.01); *H01M 10/0525* (2013.01); *H01M 10/0567* (2013.01); *H01M 10/0569* (2013.01); *H01M 4/0404* (2013.01); *H01M 4/0428* (2013.01); *H01M 2300/004* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 3,759,746 | A | 9/1973 | McCallum |
| 4,310,609 | A | 1/1982 | Liang et al. |
| 4,681,823 | A | 7/1987 | Tung et al. |
| 5,045,415 | A | 9/1991 | Witehira |
| 5,557,497 | A | 9/1996 | Ivanov et al. |
| 5,626,989 | A | 5/1997 | Doundoulakis |
| 5,631,104 | A | 5/1997 | Zhong et al. |
| 5,919,587 | A | 7/1999 | Mukherjee et al. |
| 6,613,383 | B1 | 9/2003 | George et al. |
| 6,713,177 | B2 | 3/2004 | George et al. |
| 6,913,827 | B2 | 7/2005 | George et al. |
| 6,958,174 | B1 | 10/2005 | Klaus et al. |
| 7,026,070 | B2 | 4/2006 | Noguchi et al. |
| 7,081,267 | B2 | 7/2006 | Yadav |
| 7,081,367 | B2 | 7/2006 | Shiraishi |
| 7,132,697 | B2 | 11/2006 | Weimer et al. |
| 7,211,236 | B2 | 5/2007 | Stark et al. |
| 7,396,862 | B2 | 7/2008 | Weimer et al. |
| 7,413,982 | B2 | 8/2008 | Levy |
| 7,426,067 | B1 | 9/2008 | Bright et al. |
| 7,494,746 | B2 | 2/2009 | Tarnopolsky |
| 7,553,686 | B2 | 6/2009 | George et al. |
| 7,658,340 | B2 | 2/2010 | Pfeffer et al. |

(Continued)

FOREIGN PATENT DOCUMENTS

| | | |
|---|---|---|
| EP | 2613389 | 7/2013 |
| WO | WO 99/01902 | 1/1999 |

(Continued)

OTHER PUBLICATIONS

Official Action for U.S. Appl. No. 15/679,979, dated Jan. 30, 2019, 5 pages, Restriction Requirement.
Official Action for U.S. Appl. No. 15/679,979, dated Apr. 4, 2019, 8 pages.
Official Action for U.S. Appl. No. 15/224,168, dated Apr. 11, 2019, 10 pages, Restriction Requirement.
Final Action for U.S. Appl. No. 15/660,772, dated Feb. 15, 2019, 15 pages.

(Continued)

*Primary Examiner* — Laura Weiner

(74) *Attorney, Agent, or Firm* — Sheridan Ross P.C.

(57) ABSTRACT

A high energy/power density, long cycle life and safe lithium ion cell capable of long-term deep discharge/storage near zero-volt is described. The cell utilizes a near zero-volt storage capable anode, such as a spinel $Li_4Ti_5O_{12}$, coupled to a high voltage, high-energy and/or high-power density cathode, such as $LiNi_{0.5}Mn_{1.5}O_4$. The near zero-volt storage cell is rechargeable and affords safety advantages for battery transportation, storage, and handling, and significant cost reductions for cell maintenance. The cells produce high-energy and/or high-power densities and long cycle life. The cell anode, cathode, and separator active materials are coated with one or more protection or stability enhancing and/or conductivity enhancing materials to enhance electrochemical performance and to strengthen stabilities for long-term cycle life and storage life.

21 Claims, 9 Drawing Sheets

(56) References Cited

U.S. PATENT DOCUMENTS

| | | |
|---|---|---|
| 7,674,557 B2 | 3/2010 | Sun et al. |
| 7,790,317 B1 | 9/2010 | Poeppelmeier et al. |
| 7,833,437 B2 | 11/2010 | Fan et al. |
| 7,851,580 B2 | 12/2010 | Li et al. |
| 8,124,179 B2 | 2/2012 | Nilsen et al. |
| 8,133,462 B2 | 3/2012 | Jouanneau et al. |
| 8,133,531 B2 | 3/2012 | King et al. |
| 8,137,844 B2 | 3/2012 | Awano et al. |
| 8,163,336 B2 | 4/2012 | Weimer et al. |
| 8,187,731 B2 | 5/2012 | Weimer et al. |
| 8,439,283 B2 | 5/2013 | Pfeffer et al. |
| 8,531,090 B2 | 9/2013 | Spencer, II |
| 8,637,156 B2 | 1/2014 | Weimer et al. |
| 8,735,003 B2 | 5/2014 | Kim et al. |
| 8,785,030 B2 | 7/2014 | Ueda |
| 8,808,901 B2 | 8/2014 | Wang et al. |
| 8,894,723 B2 | 11/2014 | Nilsen et al. |
| 8,956,761 B2 | 2/2015 | Reynolds et al. |
| 8,993,051 B2 | 3/2015 | Kelder et al. |
| 9,005,816 B2 | 4/2015 | Amine et al. |
| 9,054,375 B2 | 6/2015 | Choi et al. |
| 9,059,451 B2 | 6/2015 | Xiao et al. |
| 9,093,707 B2 | 7/2015 | Lee et al. |
| 9,107,851 B2 | 8/2015 | Dave et al. |
| 9,243,330 B2 | 1/2016 | Granneman et al. |
| 9,246,164 B2 | 1/2016 | Lu et al. |
| 9,627,691 B2 | 4/2017 | Xing et al. |
| 9,755,235 B2 | 9/2017 | Xing |
| 9,887,421 B2 | 2/2018 | Xing et al. |
| 2001/0041294 A1 | 11/2001 | Chu et al. |
| 2002/0012844 A1 | 1/2002 | Gan et al. |
| 2003/0054250 A1 | 3/2003 | Kweon et al. |
| 2004/0194691 A1 | 10/2004 | George et al. |
| 2005/0238949 A1 | 10/2005 | Morris et al. |
| 2006/0035147 A1 | 2/2006 | Lam et al. |
| 2006/0115738 A1 | 6/2006 | Sazhin et al. |
| 2006/0269834 A1 | 11/2006 | West et al. |
| 2007/0212604 A1 | 9/2007 | Ovshinsky et al. |
| 2007/0275284 A1 | 11/2007 | Merritt et al. |
| 2007/0281089 A1 | 12/2007 | Heller et al. |
| 2008/0020923 A1 | 1/2008 | Debe et al. |
| 2009/0047570 A1 | 2/2009 | Harper |
| 2009/0090640 A1 | 4/2009 | Jang et al. |
| 2009/0155590 A1 | 6/2009 | Kelder et al. |
| 2009/0214927 A1 | 8/2009 | Dadheech et al. |
| 2010/0035152 A1 | 2/2010 | Sastry et al. |
| 2010/0047695 A1 | 2/2010 | Smart et al. |
| 2010/0109130 A1 | 5/2010 | Pinna et al. |
| 2010/0123993 A1 | 5/2010 | Laor |
| 2010/0178481 A1 | 7/2010 | George et al. |
| 2010/0273059 A1 | 10/2010 | Sano |
| 2010/0310908 A1 | 12/2010 | Zhang et al. |
| 2011/0027658 A1 | 2/2011 | Kim et al. |
| 2011/0149473 A1 | 6/2011 | Eilertsen et al. |
| 2011/0184482 A1 | 7/2011 | Eberman et al. |
| 2011/0200863 A1 | 8/2011 | Xiao et al. |
| 2011/0236575 A1 | 9/2011 | King et al. |
| 2011/0311882 A1 | 12/2011 | Kim et al. |
| 2011/0318629 A1 | 12/2011 | Ho et al. |
| 2012/0053397 A1 | 3/2012 | Deegan et al. |
| 2012/0088164 A1 | 4/2012 | Foster et al. |
| 2012/0094213 A1 | 4/2012 | Ha et al. |
| 2012/0121932 A1 | 5/2012 | George et al. |
| 2012/0126182 A1 | 5/2012 | Zhang et al. |
| 2012/0145953 A1 | 6/2012 | Pallem et al. |
| 2012/0161456 A1 | 6/2012 | Riedmayr et al. |
| 2012/0244395 A1 | 9/2012 | Perry |
| 2012/0293110 A1 | 11/2012 | Spruce et al. |
| 2012/0301778 A1 | 11/2012 | Trevey et al. |
| 2013/0029217 A1 | 1/2013 | Bhat et al. |
| 2013/0045328 A1 | 2/2013 | Adzic et al. |
| 2013/0065137 A1 | 3/2013 | Ndzebet et al. |
| 2013/0075647 A1 | 3/2013 | Gadkaree |
| 2013/0187618 A1 | 7/2013 | Suppes |
| 2013/0244063 A1 | 9/2013 | Dhar et al. |
| 2013/0260229 A1 | 10/2013 | Uzun et al. |
| 2014/0023932 A1 | 1/2014 | Zhang et al. |
| 2014/0045033 A1 | 2/2014 | Zhang et al. |
| 2014/0093754 A1 | 4/2014 | Hamers et al. |
| 2014/0106186 A1 | 4/2014 | Dudney et al. |
| 2014/0162132 A1 | 6/2014 | Ishii et al. |
| 2014/0170524 A1 | 6/2014 | Chiang et al. |
| 2014/0217992 A1 | 8/2014 | Li et al. |
| 2014/0234732 A1 | 8/2014 | Park et al. |
| 2014/0255759 A1 | 9/2014 | Scordilis-Kelley et al. |
| 2014/0272578 A1 | 9/2014 | Xiao et al. |
| 2014/0328005 A1 | 11/2014 | Oh et al. |
| 2014/0340818 A1 | 11/2014 | Xie et al. |
| 2015/0037660 A1 | 2/2015 | Bedjaoui et al. |
| 2015/0064537 A1 | 3/2015 | Christensen et al. |
| 2015/0104715 A1 | 4/2015 | Dudenbostel et al. |
| 2015/0152549 A1 | 6/2015 | King et al. |
| 2015/0162606 A1 | 6/2015 | Kelder et al. |
| 2015/0180023 A1 | 6/2015 | Xiao et al. |
| 2015/0194701 A1 | 7/2015 | Kim et al. |
| 2015/0225853 A1 | 8/2015 | Mantymaki et al. |
| 2015/0270532 A1 | 9/2015 | Sastry et al. |
| 2015/0295242 A1* | 10/2015 | Ducros ............... H01M 4/366 |
| | | 252/182.1 |
| 2015/0357650 A1 | 12/2015 | Lakshmanan et al. |
| 2016/0043429 A1 | 2/2016 | Hatta et al. |
| 2016/0211547 A1 | 7/2016 | Hwang et al. |
| 2016/0329602 A1 | 11/2016 | Kojima |
| 2016/0344060 A1 | 11/2016 | Asano et al. |
| 2016/0344067 A1 | 11/2016 | Laramie et al. |
| 2016/0351910 A1 | 12/2016 | Albano et al. |
| 2016/0351973 A1 | 12/2016 | Albino et al. |
| 2017/0033371 A1 | 2/2017 | Cordova |
| 2017/0084401 A1 | 3/2017 | Xing |
| 2017/0263935 A1 | 9/2017 | Kozen et al. |
| 2017/0373318 A1 | 12/2017 | Xing |
| 2018/0159163 A1 | 6/2018 | Hanafusa et al. |

FOREIGN PATENT DOCUMENTS

| | | |
|---|---|---|
| WO | WO 2007/098478 | 8/2007 |
| WO | WO 2008/138132 | 11/2008 |
| WO | WO 2011/098233 | 8/2011 |
| WO | WO 2013/011297 | 1/2013 |
| WO | WO 2015/030407 | 3/2015 |
| WO | WO 2015/106769 | 7/2015 |
| WO | WO 2015/153584 | 10/2015 |
| WO | WO 2015/189284 | 12/2015 |
| WO | WO 2015/197589 | 12/2015 |
| WO | WO 2016/196445 | 12/2016 |

OTHER PUBLICATIONS

Official Action for U.S. Appl. No. 15/821,092, dated Feb, 11, 2019, 8 pages, Restriction Requirement.
Notice of Allowance for U.S. Appl. No. 15/224,168, dated Feb. 5, 2020, 9 pages.
U.S. Appl. No. 16/738,990, filed Jan. 9, 2020, Xing.
U.S. Appl. No. 16/654,911, filed Oct. 16, 2019, Cordova.
U.S. Appl. No. 16/655,947, filed Oct. 17, 2019, Cordova.
Park et al., "Ultrathin Lithium-Ion Conducting Coatings for Increased Interfacial Stability in High Voltage Lithium-Ion Batteries," Chem. Mater., 2014, vol. 26, pp. 3128-3134.
Third Party Submission for U.S. Appl. No. 15/679,979, dated Jun. 26, 2018, 14 pages.
Final Action for U.S. Appl. No. 15/821,092, dated Dec. 27, 2019, 20 pages.
U.S. Appl. No. 15/660,772, filed Jul. 26, 2017, Xing.
U.S. Appl. No. 15/821,092, filed Nov. 22, 2017, Xing.
"Lithium-air battery," retrieved from http://en.wikipedia.org/wiki/Lithium%E2%80%93air_battery, retrieved on May 26, 2015, 11 pages.
Ahn et al, "Extended Lithium Titanate Cycling Potential Window with Near Zero Capacity Loss," Electrochemistry Communications 13 (2011), pp. 796-799.
Aravindan et al. "Atomic layer deposited (ALD)SnO2 anodes with exceptional cycleability for Li-ion batteries," Nano Energy, Sep. 2013, vol. 2, No. 5, pp. 720-725.

(56) References Cited

OTHER PUBLICATIONS

Arrebola et al. "PMMA-assisted synthesis of Li1-xNi0.5Mn1.5O4-d for high-voltage lithium batteries with expanded rate capability at high cycling temperatures", Journal of Power Sources, Jun. 2008, vol. 180(2), pp. 852-858, 1 page, abstract only.
Ban et al., "Atomic layer deposition of amorphous TiO2 on graphene as an anode for Li-ion batteries," Nanotechnology, 2013, vol. 24, 424002, 6 pages.
Boukhalfa et al, "Atomic Layer Deposition of Vanadium Oxide on Carbon Nanotubes for High-Power Supercapacitor Electrodes", Energy & Environmental Science, 2012, vol. 5, pp. 6872-6879.
Beetstra et al., "Improved Li-ion Battery Performance by Coating Cathode Nano-Particles Using Atomic Layer Deposition," Refereed Proceedings of the 12th International Conference on Fluidization—New Horizons in Fluidization Engineering (2007) pp. 369-376.
Bloom, et al, "Effect of Interface Modifications on Voltage Fade in 0.5Li2MnO3-0.5LiNi0.375Co0.25)2, Cathode Materials," Journal of Power Sources, Mar. 2014, vol. 249, pp. 509-514.
Chemelewski et al., "Factors Influencing the Electrochemical Properties of High-Voltage Spinel Cathodes: Relative Impact of Morphology and Cation Ordering," Chem. Mater., 2013, vol. 25, pp. 2890-2897.
Cho et al., "Effect of Surface Modification on Nano-Structured LiNi0.5Mn1.5O4 Spinel Materials," ACS Applied Materials & Interfaces, Jul. 2015, vol. 7, No. 30, pp. 16231-16239 (Abstract Only).
Christensen et al., "A Critical Review of Li/Air Batteries," Journal of the Electrochemical Society, 2012, vol. 159(2), pp. R1-R30.
Dai et al., "Surface modified CFx cathode material for ultrafast discharge and high energy density," J. Mater. Chem. A, 2014, vol. 2, pp. 20896-20901, 1 page, abstract only.
Dobley et al., "High Capacity Cathodes for Lithium-Air Batteries," Yardney Technical Products, Inc./Lithion, Inc., 2004, 1 page.
Donders et al. "Atomic Layer Deposition of LiCoO2 Thin-Film Electrodes for All-Solid-State Li-Ion Micro-Batteries," Journal of The Electrochemical Society, 2013, vol. 160, No. 5, pp. A3066-A3071.
Elam et al., "Viscous flow reactor with quartz crystal microbalance for thin film growth by atomic layer deposition," Review of Scientific Instruments, vol. 73(8), 2002, pp. 2981-2987.
Glass et al., "Lithium ion conduction in rapidly quenched Li2O—Al2O3, Li2O—Ga2O3, and Li2O—Bi2O3 glasses," Journal of Applied Physics, 1980, vol. 51(7), p. 3756, 1 page, abstract only.
Han et al., "Atomic-Layer-Deposition Oxide Nanoglue for Sodium Ion Batteries," Nano Letters, Nov. 2013, vol. 14, No. 1, pp. 139-147.
Hao et al., "Two-step hydrothermal synthesis of submicron Li1+XNi0.5Mn1.5O4-δfor lithium-ion battery cathodes (x=0.02, δ=0.12)," Dalton Trans., 2012, vol. 41, pp. 8067-8076.
He et al., "Alumina-Coated Patterned Amorphous Silicon as the Anode for a Lithium-Ion Battery with High Coulombic Efficiency," Advanced Materials, Nov. 2011, vol. 23, No. 42, pp. 4938-4941.
Hu et al., "Oxygen-Release-Related Thermal Stability and Decomposition Pathways of LixNi0.5Mn1.5O4 Cathode Materials," Chem. Mater., 2014, vol. 26, pp. 1108-1118.
Jung et al, "Effects of Atomic Layer Deposition of Al2O3 on the Li[Li 0.20Mn0.54Ni0.13]O2 Cathode for Lithium-Ion Batteries," Journal of the Electrochemical Society (2011), vol. 158, Issue 12, pp. A1298-A1302.
Jung et al, "Unexpected Improved Performance of ALO Coated LiCoO2/Graphite Li-ion Batteries," Advanced Energy Materials, Feb. 2013, vol. 3, No. 2, pp. 213-219.
Jung et al., "Enhanced Stability of LiCoO2 Cathodes in Lithium-Ion Batteries Using Surface Modification by Atomic Layer Deposition," Journal of the Electrochemical Society, 2010, vol. 157, No. 1, A75-A81.
Jung et al., "Enhanced Stability of LiCoO2 Cathodes in Lithium-ion Batteries Using Surface Modification by Atomic Layer Deposition," Journal of the Korean Ceramic Society (2010), vol. 47, No. 1, pp. 61-65.
Jung et al., "Ultrathin Direct Atomic Layer Deposition on Composite Electrodes for Highly Durable and Safe Li-Ion Batteries," Advanced Materials, May 2010, vol. 22, No. 19, pp. 2172-2176.
Kamaya et al. "A lithium superionic conductor," Nature Materials, Sep. 2011, vol. 10, pp. 682-686.
Kang et al., "Fe3O4 Nanoparticles Confined in Mesocellular Carbon Foam for High Performance Anode Materials for Lithium-Ion Batteries," Advanced Functional Materials, Jul. 2011, vol. 21, No. 13, pp. 2430-2438.
Kim et al., "Plasma-Enhanced Atomic Layer Deposition of Ultrathin Oxide Coatings for Stabilized Lithium-Sulfur Batteries," Advanced Energy Materials, Oct. 2013, vol. 3, No. 10, pp. 1308-1315.
Kim et al., "Unexpected High Power Performance of Atomic Layer Deposition Coated Li[Ni1/3Mn1/3C01/3]), Cathodes," Journal of Power Sources, May 2014, vol. 254, pp. 190-197.
Kunduraci et al., "High-Power Nanostructured LiMn2-xNixO4 High-Voltage Lithium-Ion Battery Electrode Materials: Electrochemical Impact of Electronic Conductivity and Morphology," Chem. Mater., 2006, vol. 18, pp. 3585-3592.
Kunduraci et al., "Synthesis and Characterizaton of Nanostructured 4.7 V LixMn1.5Ni0.5O4 Spinels for High-Power Lithium-Ion Batteries," J. The Electrochem. Soc., 2006, vol. 153(7), pp. A1345-A1352.
Lahiri et al., "Ultrathin alumina-coated carbon nanotubes as an anode for high capacity Li-ion batteries," Journal of Materials Chemistry, 2011, vol. 21, No. 35, pp. 13621-13626.
Lee et al, Atomic Layer Deposition of TiO2 on Negative Electrode for Lithium Ion Batteries,: Journal of Power Sources , Dec. 2013, vol. 244, pp. 410-416.
Lee et al, "Low-temperature Atomic Layer Deposited Al2O3 Thin Film on Layer Structure Cathode for Enhanced Cycleability in Lithium-ion Batteries," Electrochimica Acta 55 (2010), pp. 4002-4006.
Lee et al, "Roles of Surface Chemistry on Safety and Electrochemistry in Lithium Ion Batteries," Acc Chem Res, Apr. 2012, vol. 46, No. 5, pp. 1161-1170.
Lee et al., "The effect of TiO2 coating on the electrochemical performance of ZnO nanorod as the anode material for lithium-ion battery," Applied Physics A, Mar. 2011, vol. 102, No. 3, pp. 545-550.
Leung et al, "Using Atomic Layer Deposition to Hinder Solvent Decomposition in Lithium Ion Batteries: First-Principles Modeling and Experimental Studies," Journal of the American Chemical Society (2011), vol. 133, No. 37, pp. 14741-14754.
Li et al, "Artificial Solid Electrolyte Interphase to Address the Electrochemical Degradation of Silicon Electrodes," Applied Materials & Interfaces, Jun. 13, 2014, vol. 6, No. 13, pp. 10083-10088.
Li et al, "Synthesis Characterization and Electrochemical Performance of AlF3-coated Li1.2(Mn0.54Ni0.16Co0.08)O2 as Cathode for Li-ion Battery," Science Press, Trans. Nonferrous Met. Soc. China Nov. 2014, vol. 24, No. 11, pp. 3534-3540 (Abstract Only).
Li et al., "Significant impact on cathode performance lithium-ion batteries by precisely controlled metal oxide nanocoatings via atomic layer deposition," Journal of Power Sources, Feb. 2014, vol. 247, pp. 57-69.
Li et al., "The improved discharge performance of LiCFx batteries by using multi-walled carbon nanotubes as conductive additive," Journal of Power Sources, 2011, vol. 196, pp. 2246-2250.
Li et al., "Tin Oxide with Controlled Morphology and Crystallinity by Atomic Layer Deposition onto Graphene Nanosheets for Enhanced Lithium Storage," Advanced Functional Materials, Apr. 2012, vol. 22, No. 8, pp. 1647-1654.
Lin et al., "Chemical and Structural Stability of Lithium-Ion Battery Electrode Materials under Electron Beam," Scientific Reports, Jul. 16, 2014, vol. 4, 5694, 6 pages.
Liu et al, "Lithium-rich Li1.2Ni0.13Co0.13Mn0.54O2 oxide coated by Li3PO4 and carbon nanocomposite layers as high performance cathode materials for lithium ion batteries," Journal of Materials Chemistry A, 2015, vol. 3, No. 6, pp. 2634-2641 (Abstract Only).
Liu et al., "Rational Design of Atomic-Layer-Deposited LiFePO4 as a High-Performance Cathode for Lithium-Ion Batteries," Advanced Materials, vol. 26, No. 37, Oct. 8, 2014, pp. 6472-6477.

(56) References Cited

OTHER PUBLICATIONS

Liu et al., "Ultrathin atomic layer deposited ZrO2 coating to enhance the electrochemical performance of Li4 Ti5O12 as an anode material," Electrochimica Acta 93 (2013), pp. 195-201.
Lu et al, "Effectively Suppressing Dissolution of Manganese from Spinel Lithium Manganate Via a Nanoscale Surface-doping Approach," Nature Communications, Dec. 16, 2014., No. 5, 5693, 8 pages.
Maeda et al., "Effect of deviation from Ni/Mn Stoichiometry in Li[Ni1/2Mn3/2]O4 upon rechargeable capacity at 4.7 V in nonaequeous lithium cells," J. Ceramic Soc. Of Japan, 2009, vol. 117(11), pp. 1216-1220.
Meng et al., "Emerging Applications of Atomic Layer Deposition for Lithium-Ion Battery Studies," Advanced Materials, Jul. 2012, vol. 24, No. 27, pp. 3589-3615.
Nanda, "Studies on Lithium Manganese Rich MNC Composite Cathodes," Oack Ridge National Laboratory, Project ID #ES106, May 16, 2013. 23 pages.
Oh, "Superior Long-Term Energy Retention and Volumetric Energy Density for Li-Rich Cathode Materials," Nano Letters, Sep. 2014, vol. 14, No. 10, pp. 5965-5972 (Abstract Only).
Piper et al., "Reversible High-Capacity Si Nanocomposite Anodes for Lithium-ion Batteries Enabled by Molecular Layer Deposition," 224th ECS Meeting, The Electrochemical Society, 2013, Abstract #954.
Ramasamy, et al., "Discharge characteristics of silver vanadium oxide cathodes," Journal of Applied Electrochemistry, 2006, vol. 36, pp. 487-497.
Rangasamy et al., "Pushing the Theoretical Limit of LiCFx Batteries: A tale of Bifunctional Electrolyte," Journal of the American Chemical Society, 2014, vol. 136, pp. 6874-6877.
Read, et al., "LiF Formation and Cathode Swelling in the Li/CFx Battery," Journal of The Electrochemical Society, 2011, vol. 158(5), pp. A504-A510, 1 page, abstract only.
Riley et al., "Electrochemical effects of ALD surface modification on combustion synthesized LiNi1/3Mn1/3O2 as a layered-cathode material," Journal of Power Sources, Mar. 2011, vol. 196, No. 6, pp. 3317-3324.
Sauvage, et al., "Room-Temperature Synthesis Leading to Nanocrystalline Ag2V4O11," J. Am. Chem. Soc., 2010, vol. 132(19), pp. 6778-6782.
Sun et al., "Atomic Layer Deposition of TiO2 on Graphene for Supercapacitors," Journal of The Electrochemical Society, 2012, vol. 159(4), pp. A364-A369.
Sun et al, "Pseudocapacitance of Amorphous TiO2 Thin Films Anchored to Graphene and Carbon Nanotubes Using Atomic Layer Deposition", The Journal of Physical Chemistry C, 2013, vol. 117 (44), pp. 22497-22508.
Takeuchi et al., "Reduction of Silver Vanadium Oxide in Lithium/Silver Vanadium Oxide Cells," Journal of the Electrochemical Society, Nov. 1988, vol. 135(11), pp. 2691-2694.
Unocic et al, "Direct Visualization of Solid Electrolyte Interphase Formation in Lithium-Ion Batteries with In Situ Electrochemical Transmission Electron Microscopy," Microscopy and Microanalysis, Aug. 2014, vol. 20, No. 4, pp. 1029-1037 (Abstract Only).
Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources, Jul. 2013, vol. 233, pp. 1-5.
Wang, et al., "Determination of Chemical Diffusion Coefficient of Lithium Ion in Graphitized Mesocarbon Microbeads with Potential Relaxation Technique," Journal of The Electrochemical Society, 2001, vol. 148(7), pp. A737-A741, 1 page, abstract only.
Wei et al., "Effects of Ni Doping on [MnO6] Octahedron in LiMn2O4," J. Phys. Chem. B, 2004, vol. 108, pp. 18547-18551.
Wu et al., "An Alumina-Coated Fe3O4-Reduced Graphene Oxide Composite Electrode as a Stable Anode for Lithium-ion Battery," Electrochimica Acta, Feb. 2015, vol. 156, pp. 147-153 (Abstract Only).

Xiao et al, "Ultrathin Multifunctional Oxide Coatings for Lithium Ion Batteries," Advanced Materials, Sep. 2011, vol. 23, No. 34, pp. 3911-3915.
Xiao et al. "High-Performance LiNi0.5Mn1.5O4 Spinel Controlled by Mn3+ Concentration and Site Disorder", Advanced Materials, 2012, vol. 24(16), pp. 2109-2116, 2 pages, abstract only.
Xiao et al., "Unravelling the Role of Electrochemically Active FePO4 Coating by Atomic Layer Deposition for Increased High-Voltage Stability of LiNi0.5Mn1 O4 Cathode Material," Advanced Science, May 2015, vol. 2, No. 5, 1500022, 6 pages.
Xiao, "Atomic Layer Coating to Mitigate Capacity Fading Associated with Manganese Dissolution in Lithium Ion Batteries," Electrochemistry Communications, Jul. 2013, vol. 32, pp. 31-34.
Xing et al., "High Performance LiNi0.5Mn1.5O4 Spinel Li-ion Battery Cathode Development," The Electrochemical Society, ECS Transations, 2013, 53(30), pp. 111-119, 9 pages.
Xing, "Atomic Layer Deposition of Metal Oxides on Activated Carbons for High Energy Density and High Performance Supercapacitors," was submitted to 227th Electrochemical Society Meeting on Nov. 30, 2014, 2 pages.
Yesibolati et al., "SnO2 Anode Surface Passivation by Atomic Layer Deposited HfO2 Improves Li-Ion Battery Performance," Small, Jul. 2014, vol. 10, No. 14, pp. 2849-2858 (Abstract Only).
Yongli et al., "Electrochemical Performance Ni Doped Spinel LiMn2O4 Cathode for Lithium Ion Batteries," Adv. Materials Res., doi:10.4028/www.scientific.net/AMR.347-353.290, 2012, 12 pages.
Zhang et al., "Electrochemical characteristic and discharge mechanism of a primary Li/CFx cell," Journal of Power Sources, 2009, vol. 187(1), pp. 233-237, 1 page, abstract only.
Zhang et al., "Preparation, Characterization and Electrochemical Catalytic Properties of Hallandite Ag2Mn8O16 for Li-Air Batteries," Journal of the Electrochemical Society, 2012, vol. 159(3), pp. A310-A314.
Zhao et al., "Atomic layer deposition of epitaxial ZrO2 coating on LiMn2O4 nanoparticles for high-rate lithium ion batteries at elevated temperature," Nano Energy, Sep. 2013, vol. 2, No. 5, pp. 882-889.
Zheng et al, "Mitigating Voltage Fade in Cathode Materials by Improving the Atonic Level Uniformity of Elemental Distribution," Nano Letters, Apr. 2014, vol. 14, No. 5, pp. 2628-2635.
Zhong, "Lithium-Air Batteries: An Overview," Submitted as coursework for PH240, Stanford University, Dec. 3, 2011, 4 pages.
Zhou et al., "LiNi0.5Mn1.5O4 Hollow Structures as High-Performance Cathodes for Lithium-Ion Batteries," Angew. Chem. Int. Ed., 2012, vol. 51, pp. 239-241.
Official Action for U.S. Appl. No. 14/175,873, dated Oct. 7, 2015, 7 pages.
Final Action for U.S. Appl. No. 14/175,873, dated May 5, 2016, 6 pages.
Notice of Allowance for U.S. Appl. No. 14/175,873, dated Nov. 21, 2016, 8 pages.
Restriction Requirement for U.S. Appl. No. 14/606,932, dated Apr. 20, 2016, 7 pages.
Official Action for U.S. Appl. No. 14/606,932, dated Jul. 1, 2016, 22 pages.
Official Action for U.S. Appl. No. 14/606,932, dated Mar. 16, 2017, 15 pages.
Notice of Allowance for U.S. Appl. No. 14/606,932, dated Sep. 21, 2017, 11 pages.
Official Action for U.S. Appl. No. 14/802,805, dated Dec. 15, 2016, 8 pages.
Notice of Allowance for U.S. Appl. No. 14/802,805, dated Apr. 25, 2017, 7 pages.
Official Action for U.S. Appl. No. 15/162,234, dated Nov. 8, 2017, 12 pages.
Final Action for U.S. Appl. No. 15/162,234, dated Jun. 21, 2018, 7 pages.
Final Action for U.S. Appl. No. 15/660,772, dated Aug. 24, 2018, 7 pages.
Miller et al., "The mechanical robustness of atomic-layer and molecular-layer deposited coatings on polymer substrates," Journal of Applied Physics, 2009, vol. 105, pp. 093527-1-093527-12.
Notice of Allowance for U.S. Appl. No. 15/679,979, dated Sep. 30, 2019, 8 pages.

(56) References Cited

OTHER PUBLICATIONS

Official Action for U.S. Appl. No. 15/224,168, dated Aug. 22, 2019, 14 pages.
Official Action for U.S. Appl. No. 15/821,092, dated Jul. 16, 2019, 16 pages.
Notice of Allowance for U.S. Appl. No. 15/162,234, dated Oct. 4, 2018, 7 pages.
Official Action for U.S. Appl. No. 15/224,168, dated Nov. 29, 2018, 6 pages, Restriction Requirement.
Official Action for U.S. Appl. No. 15/821,092, dated Jul. 17, 2020, 10 pages, Restriction Requirement.
Official Action for U.S. Appl. No. 15/821,092, dated Jan. 28, 2021, 20 pages.

* cited by examiner

HIGH ENERGY/POWER DENSITY, LONG CYCLE LIFE, SAFE LITHIUM-ION BATTERY CAPABLE OF LONG-TERM DEEP DISCHARGE/STORAGE NEAR ZERO VOLT AND METHOD OF MAKING AND USING THE SAME

CROSS REFERENCE TO RELATED APPLICATIONS

This application claims priority and benefits under 35 U.S.C. § 119(e) to U.S. Provisional Patent Application Ser. No. 62/475,655 filed on Mar. 23, 2017, entitled "High Energy/Power Density, Long Cycle Life, Safe Lithium-ion Battery Capable of Long-Term Deep Discharge/Storage Near Zero Volt and Method of Making and Using the Same", which is incorporated herein in its entirety by this reference.

FIELD

This disclosure relates generally to electrochemical energy storage devices and methods of making and using the same. More generally, this disclosure relates to high energy, high power density, long cycle life, and safe lithium ion batteries capable of long-term deep discharge and long-term storage near zero-volt.

BACKGROUND

The current state of the art uses a wide number of lithium-based battery chemistries. Most lithium-ion batteries function through lithium ion intercalation and deintercalation. A prominent lithium-ion battery has a lithium iron phosphate cathode and a graphite anode. This electrochemical configuration is widely used in many applications due to its benign nature when compared to other high-energy, lithium-ion chemistries. Lithium iron phosphate is a member of the olivine-structured orthophosphates, $LiMPO_4$, where M can be manganese, iron, cobalt and/or nickel. Lithium iron phosphate is the most studied among the olivine cathodes and is commercially available. Lithium iron phosphate has a practical specific capacity of about 140 mAh/g and an average discharge voltage of about 3.4V at a C/20-rate. Owing to the strong covalent bonding between the oxygen and phosphorous (in a +5 oxidation state) that forms tetrahedral polyanion units $(PO_4)^{3-}$. The olivine lithium iron phosphate cathode does not liberate oxygen easily; this represents a unique and attractive safety feature to battery power source users.

However, the low redox potential of lithium iron phosphate generally corresponds with the use of a graphite-based anode, which offers a lithium ion intercalation theoretical capacity of 372 mAh/g and about 0.1V potential vs. $Li/Li^+$. This leads to a cell voltage of about 3.3V (at low rates). While conventional lithium-ion battery electrolytes, consisting of a lithium salt dissolved in a carbonate solvent mixture, are not reductively stable on a lithiated graphite anode, the inclusion of passivation co-solvents (e.g., ethylene carbonate) results in enhanced anode stability. In particular, this results from the formation of a solid electrolyte interface film that is reductively formed on a lithiated graphite anode surface during battery formation cycles. The solid electrolyte interface protects the graphite anode from further electrolyte reduction and enables functional storage and operation, if the battery is maintained within a specific voltage range according to: 3.5V>graphite/lithium iron phosphate cells>2V.

When graphite-based lithium-ion batteries are operationally discharged or stored near zero-volts, the anode and cathode potentials are crossed; the zero-volt potential is labeled as zero-volt crossing potential (ZCP). The zero-volt crossing potential is typically higher than the graphite anode substrate current collector (most commonly copper metal or copper foil) dissolution potential, SDP, with a Cu dissolution reaction according to $Cu \rightarrow Cu^{2+}+2e^-$. The zero-volt crossing potential is also higher than the solid electrolyte interface film dissolution potential. Thus, the discharge or storage of graphite anode-based lithium-ion batteries to near zero-volt is detrimental to the health and safety characteristics of the battery that is manifested by a rapid, severe irreversible capacity fade and rise in internal resistance.

A promising remedy to enable near zero-volt storage of graphite anode-based lithium-ion batteries is the use of a substrate or current collector with a higher substrate dissolution potential for the graphite anode. For example, a titanium, $Ti^0$, substrate offers a substrate dissolution potential that is greater than the zero-volt crossing potential. However, this approach is restricted to a limited number of cathode materials, such as $LiNiCoO_2$ as opposed to, such as widely used $LiCoO_2$. We speculate that this is because the $LiCoO_2$ cathode-based battery may still suffer from near zero-volt discharge/storage (with capacity loss) due to the dissolution of the solid electrolyte interface film on graphite anode, that is zero-volt crossing potential greater than the film dissolution potential. Another drawback of the graphite anode-based battery lies in a potential safety concern related to lithium dendrite growth on graphite anode especially when charging at high rates and/or at low temperatures, which increases the possibility of cell short circuit leading to cell failure (through thermal runaway). Therefore, there is a need for a high performance, near zero-volt storage capable battery technology that overcomes these shortcomings.

SUMMARY

These and other needs are addressed by the various embodiments and configurations of the present disclosure. The present disclosure can provide a number of advantages depending on the particular configuration. These and other advantages will be apparent from the disclosure of the disclosure contained herein.

In accordance with some embodiments of the present disclosure is an electrode for an electrochemical energy storage device. The can have a current collector and an anode active material positioned on the current collector. The anode active is generally selected from the group consisting essentially of $Li_4Ti_5O_{12}$, phosphorous, bismuth, antimony, a Bi—Sb alloy, a transition metal oxide, a transition metal fluoride, a transition metal nitride, a transition metal phosphide, and a transition metal sulfide and a mixture thereof. The transition metal comprises one or more of Ti, V, Cr, Mn, Fe, Co, Ni, Cu, and Zn.

In some embodiments, the anode active material is $Li_4Ti_5O_{12}$.

In some embodiments, the $Li_4Ti_5O_{12}$ can be an atomic-deposited layer.

In some embodiments, the $Li_4Ti_5O_{12}$ can be a molecular-deposited layer.

In some embodiments, the $Li_4Ti_5O_{12}$ can be a slurry-coated layer.

In some embodiments, the anode active material is encapsulated in a polymeric network. The polymeric-encapsulated anode active material can be one of lithium aluminum oxide, lithium niobium oxide, and lithium lanthanum titanate, $Li_{3x}La_{(2/3)-x}TiO_3$, where is x is about 0.11.

In some embodiments, the polymeric network can be one or more of: (a) an organic polymer or an organic-inorganic hybrid polymer coating; (b) an electronic conductive polymer; (c) an ionic conductive polymer; (d) a combination of an electronic polymer and an ionic conductive polymer; (e) a zincone, generally represented by chemical formula: $(Zn-O-CH_2-CH_2-O)_n$; (f) a mixture of ZnO and a zincone generally represented by the chemical formula: $(Zn-O-CH_2-CH_2-O)_n$; (g) a lithium-doped poly(zinc glycol); (h) a lithiated poly(zinc glycol); (i) an alucone generally represented by the following chemical formula: $(-O-Al-O-C_2H_4-)_n$; (j) a lithium-doped poly(aluminum glycol); (k) a lithiated poly(aluminum glycol); (l) a titanicone, typically represented by the chemical formula $(Ti-O-CH_2-CH_2-O-)_x$; (m) a titanicone, typically represented by the chemical formula $(Ti-O-CH_2-CHOH-CH_2-O-)_x$; (n) a lithium-doped poly(titanium glycol); (o) a lithiated poly(titanium glycol); (p) a lithiated poly(titanium propanol); and (q) a lithium-doped poly(titanium propanol).

In accordance with embodiments of the present invention is an electrochemical energy storage device. In some embodiments, the electrochemical energy storage device includes an anode and cathode. The anode can include an anode current collector and lithium titanium oxide. The cathode can include a cathode current collector and a cathode active material. In some embodiments, the lithium titanium oxide is coated with a functional material. Moreover, the lithium titanium oxide coated with the functional material can be encapsulated in a polymeric network.

In some embodiments of the present invention, one or more of the following are true for the electrochemical energy storage device: (a) the anode current collector is aluminum foil; (b) the cathode current collector is aluminum foil; (c) the lithium titanium oxide coating on the anode current collector is one of an atomic-deposited layer, a molecular-deposited layer, a slurry-coated layer, and a combination thereof; (d) the lithium nickel manganese oxide coating on the cathode current collector is one of an atomic-deposited layer, a molecular-deposited layer, a slurry-coated layer, and a combination thereof; and (e) the lithium titanium oxide is $Li_4Ti_5O_{12}$ and the cathode active material has a major redox potential of more than above 4.25 volts vs. Li/Li$^+$.

In some embodiments, the lithium titanium oxide encapsulated within the polymeric network further includes one or more of lithium aluminum oxide, lithium niobium oxide, lithium lanthanum titanate, and $Li_{3x}La_{(2/3)-x}TiO_3$, where is x is about 0.11.

In some embodiments, the cathode active material is selected from the group consisting essentially of a lithium transition metal oxide, a lithium transition metal nitride, a lithium transition metal fluoride, a lithium transition metal sulfide, a lithium transition metal phosphate, a lithium transition metal oxide, and mixtures thereof.

In some embodiments of the present invention one or more of following are true for the electrochemical energy storage device: (a) the polymeric network is one of an organic polymer or an organic-inorganic hybrid polymer coating; (b) the polymeric network is an electronic conductive polymer; (c) the polymeric network is an ionic conductive polymer; (d) the polymeric network is a combination of an electronic polymer and an ionic conductive polymer; (e) the polymer network is a zincone, generally represented by chemical formula: $(Zn-O-CH_2-CH_2-O)_n$; (f) the polymer network is a mixture of ZnO and a zincone generally represented by the chemical formula: $(Zn-O-CH_2-CH_2-O)_n$; (g) the polymeric network is a lithium-doped poly(zinc glycol); (h) the polymeric network is a lithiated poly(zinc glycol); (i) the polymeric network is an alucone generally represented by the following chemical formula: $(-O-Al-O-C_2H_4-)_n$; (j) the polymeric network comprises a lithium-doped poly(aluminum glycol); (k) the polymeric network is a lithiated poly(aluminum glycol); (l) the polymeric network comprises a titanicone, typically represented by the chemical formula $(Ti-O-CH_2-CH_2-O-)_x$; (m) the polymeric network is a titanicone, typically represented by the chemical formula $(Ti-O-CH_2-CHOH-CH_2-O-)_x$; (n) the polymeric network is a lithium-doped poly(titanium glycol); (o) the polymeric network is a lithiated poly(titanium glycol); (p) the polymeric network is a lithiated poly(titanium propanol); and (q) the polymeric network comprises a lithium-doped poly(titanium propanol).

In accordance with some embodiments of the present invention is an electrochemical energy storage device. In some embodiments, the electrochemical energy storage device includes a cathode, an anode and an electrolyte in ionic contact with the anode and cathode. In some embodiments, the cathode includes a lithium nickel manganese oxide coated cathode current collector. In some embodiments, the anode includes a lithium titanium oxide coated anode current collector. In some embodiments, the electrolyte includes two or more carbonate solvents.

In some embodiments, the two or more carbonate solvents are selected from the group consisting essentially of ethylene carbonate, dimethyl carbonate, bis (2,2,2-trifluoroethyl) carbonate, bis (3,3,3-trifluoropropyl) carbonate and mixtures thereof.

In some embodiments, the electrolyte is selected from the group consisting essentially of (a) $LiPF_6$ and a 1:1 by volume % mixture of ethylene carbonate and dimethyl carbonate; (b) $LiPF_6$ and a 1:1:2 by volume % mixture of ethylene carbonate, dimethyl carbonate, and bis (2,2,2-trifluoroethyl) carbonate, respectively; (c) $LiPF_6$ and a 1:1:2 by volume % mixture of ethylene carbonate, dimethyl carbonate, and bis (3,3,3-trifluoropropyl) carbonate, respectively; and (d) $LiPF_6$ and a 1:4 by volume % mixture of ethylene carbonate and dimethyl carbonate.

In some embodiments, the lithium titanium oxide coated cathode current collector includes an aluminum foil cathode current collector and a lithium nickel manganese oxide coating of $LiNi_{0.5}Mn_{1.5}O_4$. In some embodiments, the lithium titanium oxide coated anode current collector includes an aluminum foil anode current collector and a lithium titanium oxide coating of $Li_4Ti_5O_{12}$.

In some embodiments, the lithium titanium oxide coated anode current collector further includes one or more of lithium aluminum oxide, lithium niobium oxide, lithium lanthanum titanate, and $Li_{3x}La_{(2/3)-x}TiO_3$, where is x is about 0.11.

In some embodiments, the lithium titanium oxide coated anode current collector further includes lithium titanium oxide encapsulated within a polymeric network.

Moreover, in some embodiments of the electrochemical energy storage devices one or more of following are true: (a) the polymeric network is one of an organic polymer or an organic-inorganic hybrid polymer coating; (b) the polymeric network is an electronic conductive polymer; (c) the polymeric network is an ionic conductive polymer; (d) the polymeric network is a combination of an electronic polymer and an ionic conductive polymer; (e) the polymer network is a zincone, generally represented by chemical formula: $(Zn-O-CH_2-CH_2-O)_n$; (f) the polymer network is a mixture of ZnO and a zincone generally represented by the chemical formula: $(Zn-O-CH_2-CH_2-O)_n$; (g) the polymeric network is a lithium-doped poly(zinc glycol); (h) the polymeric network is a lithiated poly(zinc glycol); (i) the polymeric network is an alucone generally represented by the following chemical formula: $(-O-Al-O-C_2H_4-)_n$; (j) the polymeric network is a lithium-doped poly(aluminum glycol); (k) the polymeric network is a lithiated poly(aluminum glycol); (l) the polymeric network is a titanicone, typically represented by the chemical formula $(Ti-O-CH_2-CH_2-O-)_x$; (m) the polymeric network is a titanicone, typically represented by the chemical formula $(Ti-O-CH_2-CHOH-CH_2-O-)_x$; (n) the polymeric network is a lithium-doped poly(titanium glycol); (o) the polymeric network is a lithiated poly(titanium glycol); (p) the polymeric network is a lithiated poly(titanium propanol); and (q) the polymeric network is a lithium-doped poly(titanium propanol).

In some embodiments, the electrochemical energy storage device includes one of a near zero-volt electrochemical cell and a near zero-volt battery.

Some embodiments of the electrochemical energy storage device further include a separator comprising one or more of polymeric material, a fibrous material and a naturally occurring material. In some embodiments, the electrolyte is in ionic contact with the separator.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "lanthanide" as used herein generally refers to one more of more of metallic chemical elements with atomic numbers 21, 39, and 57 through 71. More specifically, to scandium, yttrium, lanthanum, cerium, praseodymium, neodymium, promethium, samarium, europium, gadolinium, terbium, dysprosium, holmium, erbium, thulium, ytterbium and lutetium.

Unless otherwise noted, all component or composition levels are in reference to the active portion of that component or composition and are exclusive of impurities, for example, residual solvents or by-products, which may be present in commercially available sources of such components or compositions.

The phrase "continuous coating" as used herein generally refers to the coating covering most, if not all, of the surface of the material and/or object having the coating applied thereto. Commonly, from about 50% to about 100% of the surface of the object is one or more of in contact with and covered by the coating, more commonly from about 80% to about 100%, even more commonly from about 85% to about 100%, yet even more commonly from about 90% to about 100%, still yet even more commonly from about 95% to about 100%, and yet still yet even more commonly from about 98% to about 100% of the surface of the object is one or more of in contact with and covered by the coating. The phrase can also refer to coating being substantially free and devoid of one or more of apertures, holes, voids, openings, and gaps.

The phrase "discontinuous coating" as used herein generally refers to the coating covering some, but not all, of the surface of the material and/or object having the coating applied thereto. Commonly, from about 1% to about 90% of the surface of the object is one or more of in contact with and covered by the coating, more commonly from about 10% to about 85%, even more commonly from about 20% to about 80%, yet even more commonly from about 30% to about 75%, still yet even more commonly from about 40% to about 70%, and yet still yet even more commonly from about 50% to about 65% of the surface of the object is one or more of in contact with and covered by the coating. The phrase can also refer to coating having one or more of apertures, holes, voids, openings, and gaps.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various embodiments of the disclosure, as illustrated by the drawings referenced below.

DETAILED DESCRIPTION

Figure 1:
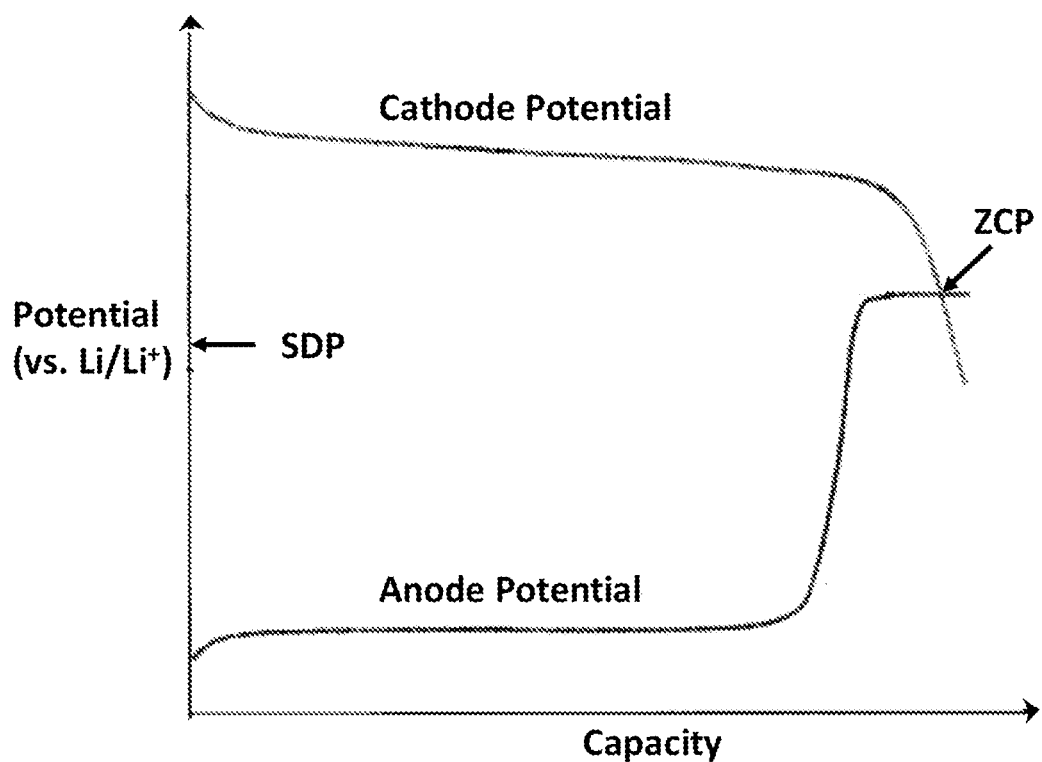
FIG. 1 depicts the three-electrode potentials of graphite/$LiCoO_2$ battery and reference copper dissolution potential according to some embodiments of the present disclosure.

This disclosure relates to a high energy density, high power density, long cycle life and safe lithium ion battery capable of long-term deep discharge/storage near zero-volt (at about near zero-volts). Lithium ion cells of the present disclosure generally include a near zero-voltage storage capable anode. The near zero-volt storage capable anode is generally coupled to a high voltage, high energy and/or high power density cathode. The near zero-volt storage capable anode can comprise $Li_4Ti_5O_{12}$, typically in the form of a spinel. The high voltage, high energy and/or power density cathode can comprise $LiNi_{0.5}Mn_{1.5}O_4$. The near zero-volt storage capable rechargeable cell according to this disclosure can offer one or more of safety advantages for cell and/or battery transportation, storage, and handling. The near zero-volt storage capable rechargeable cell can also offer a significant cost reduction for cell and/or battery maintenance, while providing one or more of high energy density, high power density, and a long cycle life.

Typically, the near zero-volt storage capable rechargeable cell comprises anode and cathode active materials and a separator. The anode and cathode active materials and the separator can further comprise one or more of protection materials, stability enhancing materials, and conductivity enhancing materials. The one or more protection, stability enhancing, and conductivity enhancing materials can be in form of one or more of a layer, a functional layer, and a coating. Moreover, the one or more protection, stability enhancing, and conductivity enhancing materials can improve electrochemical performance, strengthen stabilities or both. The one or more protection, stability enhancing, and conductivity enhancing materials can be applied to one or more of the anode and cathode active materials and the separator by atomic layer deposition, molecular layer deposition, or a combination of atomic and molecular layer depositions. The one or more protection, stability enhancing, and conductivity enhancing materials can increase the long-term cycle life of the anode active materials, the cathode active materials and the separator. The one or more protection, stability enhancing, and conductivity enhancing materials can increase the storage life of the anode active materials, the cathode active materials and the separator.

Cathode Active Materials

Generally, the cathode active material can comprise of one or more materials that can store energy electrochemically through Faradaic redox reactions.

The cathode active material can have a major redox potential of more than above 4.25 volts vs. $Li/Li^+$ (high voltage cathode). In some embodiments, the cathode active material can have a major redox potential from above 4.5 to about 5.5 volts versus $Li/Li^+$.

The cathode active material can comprise a lithium transition metal oxide, a lithium transition metal nitride, a lithium transition metal fluoride, a lithium transition metal sulfide, a lithium transition metal phosphate, or a mixture thereof. The cathode active material can be selected from the group consisting essentially of lithium transition metal oxides, lithium transition metal nitrides, lithium transition metal fluorides, lithium transition metal sulfides, lithium transition metal phosphates, and mixtures thereof.

The high redox potential cathode material can comprise one or more of $LiNi_{0.5}Mn_{1.5}O_4$, $LiCr_{0.1}Ni_{0.4}Mn_{1.5}O_4$, $LiCr_{0.5}Mn_{1.5}O_4$, $LiFe_{0.5}Mn_{1.5}O_4$. $LiCo_{0.5}Mn_{1.5}O_4LiNi_{0.5}Mn_{1.5}O_4$, and $LiCu_{0.5}Mn_{1.5}O_4$. In some embodiments, the high redox potential cathode material can be selected from the group consisting of $LiNi_{0.5}Mn_{1.5}O_4$, $LiCr_{0.1}Ni_{0.4}Mn_{1.5}O_4$, $LiCr_{0.5}Mn_{1.5}O_4$, $LiFe_{0.5}Mn_{1.5}O_4$. $LiCo_{0.5}Mn_{1.5}O_4LiNi_{0.5}Mn_{1.5}O_4$, $LiCu_{0.5}Mn_{1.5}O_4$, and mixtures thereof.

The high redox potential cathode material can comprise one or more of $LiCrMnO_4$, $LiCoMnO_4$, and $LiFeMnO_4$. In some embodiments, the high redox potential cathode material be selected from the group consisting of $LiCrMnO_4$, $LiCoMnO_4$, $LiFeMnO_4$, and mixtures thereof.

The high redox potential cathode material can comprise one or more of $LiMg_{0.05}Ni_{0.45}Mn_{1.5}O_4$, $Li_{1.01}Cu_{0.32}Mn_{1.67}O_4$, $LiCo_{0.2}Ni_{0.4}Mn_{1.4}O_4$, $LiNiVO_4$, $Li_{1.14}Ni_{0.29}Mn_{0.57}O_2$, $Li_2CoPO_4F$, $LiVPO_4F$, $LiNiPO_4$, $LiCoPO_4$, $LiMn_{0.8}Fe_{0.1}Fe_{0.1}PO_4$, $LiMn_{0.8}Fe_{0.1}Co_{0.1}PO_4$, $LiMn_{0.8}Fe_{0.1}Ni_{0.1}PO_4$, and $LiMn_{0.8}Fe_{0.1}Cu_{0.1}PO_4$. In some embodiments the high redox potential cathode material can be selected from the group consisting of $LiMg_{0.05}Ni_{0.45}Mn_{1.5}O_4$, $Li_{1.01}Cu_{0.32}Mn_{1.67}O_4$, $LiCo_{0.2}Ni_{0.4}Mn_{1.4}O_4$, $LiNiVO_4$, $Li_{1.14}Ni_{0.29}Mn_{0.57}O_2$, $Li_2CoPO_4F$, $LiVPO_4F$, $LiNiPO_4$, $LiCoPO_4$, $LiMn_{0.8}Fe_{0.1}Fe_{0.1}PO_4$, $LiMn_{0.8}Fe_{0.1}Co_{0.1}PO_4$, $LiMn_{0.8}Fe_{0.1}Ni_{0.1}PO_4$, $LiMn_{0.8}Fe_{0.1}Cu_{0.1}PO_4$, and mixtures thereof.

The high redox potential cathode material can comprise one or more of Lithium-rich layered $Li[Li_{1/3}Mn_{2/3}]O_2$—$LiNiO_2$, $Li[Li_{1/3}Mn_{2/3}]O_2$—$LiCoO_2$, $Li[Li_{1/3}Mn_{2/3}]O_2$—$LiMnO_2$, $Li_2MnO_3$—$LiNiO_2$), $Li_2MnO_3$—$LiCoO_2$), and $Li_2MnO_3$—$LiMnO_2$). In some embodiments, the high redox potential cathode material can be selected from the group consisting of lithium-rich layered $Li[Li_{1/3}Mn_{2/3}]O_2$—$LiNiO_2$, $Li[Li_{1/3}Mn_{2/3}]O_2$—$LiCoO_2$, $Li[Li_{1/3}Mn_{2/3}]O_2$—$LiMnO_2$, $Li_2MnO_3$—$LiNiO_2$), $Li_2MnO_3$—$LiCoO_2$), $Li_2MnO_3$—$LiMnO_2$), and mixtures thereof.

The high redox potential cathode material can comprise one or one of $LiNi_{1/3}Mn_{1/3}Co_{1/3}O_2$ and $LiNi_xMn_yCo_zO_2$ (where, $x+y+z=1$). In some embodiments, the high redox potential cathode material can be selected from the group consisting of $LiNi_{1/3}Mn_{1/3}Co_{1/3}O_2$, $LiNi_xMn_yCo_zO_2$ (where, $x+y+z=1$), and mixtures thereof.

The high redox potential cathode material can comprise one or more of $LiNi_{0.8}Co_{0.15}Al_{0.05}O_2$, and $LiNi_{1-x-y}Co_xAl_yO_2$ (where, $x=0.15\pm0.03$, $y=0.05\pm0.03$). In some embodiments, the high redox potential cathode material can be selected from the group consisting of $LiNi_{0.8}Co_{0.15}Al_{0.05}O_2$, $LiNi_{1-x-y}Co_xAl_yO_2$ (where, $x=0.15\pm0.03$, $y=0.05\pm0.03$), and a mixture thereof.

The high redox potential cathode material can comprise one or more of $Li_2FeSiO_4$, $Li_2CoP_2O_7$, and $Li_{2-x}CoP_2O_7$. In some embodiments, the high redox potential cathode material can be selected from the group consisting of $Li_2FeSiO_4$, $Li_2CoP_2O_7$, $Li_{2-x}CoP_2O_7$, and mixtures thereof.

The cathode can include a cathode current collector and a cathode active material. In some embodiments, the cathode active material is selected from the group consisting essentially of a lithium transition metal oxide, a lithium transition metal nitride, a lithium transition metal fluoride, a lithium transition metal sulfide, a lithium transition metal phosphate, a lithium transition metal oxide, and mixtures thereof.

Anode Active Materials

Generally, the anode active material can comprise of one or more materials that can store energy electrochemically through Faradaic redox reactions.

The anode active materials can comprise one or more of a lithium titanate spinel $Li_4Ti_5O_{12}$, phosphorous, bismuth, antimony, a Bi—Sb alloy, a transition metal oxide, a transition metal fluoride, a transition metal nitride, a transition metal phosphide, and a transition metal sulfide, where the transition metal comprises one or more of Ti, V, Cr, Mn, Fe, Co, Ni, Cu, and Zn. In some embodiments, the anode active materials can be selected from the group consisting essentially of lithium titanate spinels $Li_4Ti_5O_{12}$, phosphorous, bismuth, antimony, Bi—Sb alloys, transition metal oxides, transition metal fluorides, transition metal nitrides, transition metal phosphides, transition metal sulfides, and mixtures thereof, and where the transition metal can be selected from the group consisting of Ti, V, Cr, Mn, Fe, Co, Ni, Cu, Zn, and combinations thereof.

The anode active material can comprise one or more of a titanium oxide, a nickel oxide, a cobalt oxide, an iron oxide, a copper oxide, a nickel nitride, a cobalt nitride, a nickel phosphide, a cobalt phosphide, and a manganese phosphide. In some embodiments, the anode active material can be selected from the group consisting of titanium oxides, nickel oxides, cobalt oxides, iron oxides, copper oxides, nickel nitrides, cobalt nitrides, nickel phosphides, cobalt phosphides, manganese phosphides, and mixtures thereof.

The anode active material generally comprises a material having a major chemical potential lower than the lowest unoccupied molecular orbital of the electrolyte. While not wanting to be bound by any theory, it is believed that when the major chemical potential of the anode active material is lower than the lowest unoccupied molecular orbital of the electrolyte, the formation of solid electrolyte interface film on the cathode can be substantially avoided.

The anode active material can have a major redox potential greater than reduction potential of the electrolyte. While not wanting to be bound by any theory, it is believed that when the major chemical potential of the anode active material is greater than reduction potential of the electrolyte the formation of solid electrolyte interface film on the cathode can be substantially avoided. In some embodiments the anode active material can have a major redox potential of more than about 0.45 volts versus Li/Li+, a high voltage cathode. In some embodiments, the anode active material can have a major redox potential from above 0.5 to about 1.2 volts versus Li/Li+. It is believed that these redox potentials can substantially reduce the formation of a solid electrolyte interface film on the cathode.

The anode active material can comprise one or more of $Li_4Ti_5O_{12}$, NiO, CoO, $Co_3O_4$, $Cr_2O_3$, $V_2O_3$, $TiO_2$, MnO, $MnO_2$, $Mn_2O_3$, ZnO, FeO, $Fe_2O_3$, $Fe_3O_4$, CuO, $Cu_2O$, ZnO, $MnCo_2O_4$, $CoMn_2O_4$, $NiMn_2O_4$, $ZnMn_2O_4$, $TiF_3$, $VF_3$, $MnF_2$, $Ni_3N$, $Co_3N_3$, MnS, $MnS_2$, FeS, $TiS_2$, $TiS_2$, CuS, $NiP_3$, $Ni_2P$, $MnP_4$, $CoSb_3$, and TiSnSb. In some embodiments, the anode active material can be selected from the group consisting essentially of $Li_4Ti_5O_{12}$, NiO, CoO, $Co_3O_4$, $Cr_2O_3$, $V_2O_3$, $TiO_2$, MnO, $MnO_2$, $Mn_2O_3$, ZnO, FeO, $Fe_2O_3$, $Fe_3O_4$, CuO, $Cu_2O$, ZnO, $MnCo_2O_4$, $CoMn_2O_4$, $NiMn_2O_4$, $ZnMn_2O_4$, $TiF_3$, $VF_3$, $MnF_2$, $Ni_3N$, $Co_3N_3$, MnS, $MnS_2$, FeS, $TiS_2$, $TiS_2$, CuS, $NiP_3$, $Ni_2P$, $MnP_4$, $CoSb_3$, TiSnSb, and mixtures thereof.

The anode can comprise an anode current collector and lithium titanium oxide. In some embodiments, the lithium titanium oxide can be coated with a functional material. Moreover, the lithium titanium oxide coated with the functional material can be encapsulated in a polymeric network.

In some embodiments, the lithium titanium oxide encapsulated within the polymeric network further comprise one or more of lithium aluminum oxide, lithium niobium oxide, lithium lanthanum titanate, and $Li_{3x}La_{(2/3)-x}TiO_3$, where is x is about 0.11.

In some embodiments of the present invention the polymeric network can comprise one: (a) an organic polymer or an organic-inorganic hybrid polymer coating; (b) an electronic conductive polymer; (c) an ionic conductive polymer; (d) a combination of an electronic polymer and an ionic conductive polymer; (e) a zincone, generally represented by chemical formula: $(Zn-O-CH_2-CH_2-O)_n$; (f) a mixture of ZnO and a zincone generally represented by the chemical formula: $(Zn-O-CH_2-CH_2-O)_n$; (g) a lithium-doped poly(zinc glycol); (h) a lithiated poly(zinc glycol); (i) an alucone generally represented by the following chemical formula:

(—O—Al—O—$C_2H_4$-)$_n$; (j) a lithium-doped poly(aluminum glycol); (k) is a lithiated poly(aluminum glycol); (l) a titanicone, typically represented by the chemical formula (Ti—O—$CH_2$—$CH_2$—O—)$_x$; (m) a titanicone, typically represented by the chemical formula (Ti—O—$CH_2$—CHOH—$CH_2$—O—)$_x$; (n) a lithium-doped poly(titanium glycol); (o) a lithiated poly(titanium glycol); (p) a lithiated poly(titanium propanol); and (q) a lithium-doped poly(titanium propanol).

Separator

The separator can comprise a polymeric film. The polymeric film can comprise one or more of a polyolefin film, a polyethylene film, a polypropylene film, a poly(tetrafluoroethylene) film, and a polyvinyl chloride film. The separator can comprise a nonwoven fibrous material. The nonwoven fibrous material can comprise one or more of cotton, nylon, polyester, glass, and naturally occurring substances. The naturally occurring substances can comprise rubber, asbestos, wood, and a mixture thereof. In some embodiments, the separator can be selected from the group consisting essentially of polymeric films, nonwoven fibrous materials, naturally occurring substances, and mixtures thereof. The polymeric films can be selected from the group consisting essentially of polyolefin films, polyethylene films, polypropylene films, poly(tetrafluoroethylene) films, polyvinyl chloride films and combinations thereof. The nonwoven fibrous materials can be selected from the group consisting essentially of cotton, nylon, polyesters, glass, rubber, asbestos, wood, and mixtures thereof. The naturally occurring materials can be selected from the group consisting essentially of cotton, rubber, asbestos, wood, and mixtures thereof.

Electrolyte

The electrolyte can comprise an ionic conducting electrolyte. The ion conducting electrolyte can comprise one or more of a non-aqueous electrolyte, an aprotic liquid electrolyte, a room temperature ionic liquid electrolyte, a polymeric electrolyte, a polymeric gel electrolyte, and a solid-state electrolyte. In some embodiments, the electrolyte can be an ionic conducting electrolyte. The ionic conducting electrolyte can be selected from the group consisting essentially of a non-aqueous electrolyte, an aprotic liquid electrolyte, a room temperature ionic liquid electrolyte, a polymeric electrolyte, a polymeric gel electrolyte, a solid-state electrolyte, and mixtures thereof.

In some embodiments, the non-aqueous electrolyte can comprise an aprotic liquid electrolyte. The aprotic liquid can comprise one or more organic solvents.

In some embodiments, the non-aqueous electrolyte can comprise of a lithium ion electrolyte salt dissolved in one or more organic solvents.

The lithium ion electrolyte can comprise one or more of lithium hexafluorophosphate, lithium hexafluoroarsenate, lithium perchlorate, lithium tetrafluoroborate, lithium trifluoromethane sulfonate, lithium bis(fluorosulfonyl)imide, lithium bis(oxalato)borate, lithium bis(trifluoromethanesulfonyl)imide, lithium bis(pentafluoroethylsulfonyl)imide, lithium tris(trifluoromethylsulfonyl)methide, lithium trifluoro tris(pentafluoroethyl)phosphate, lithium hexafluoroisopropoxide, lithium malonate borate, lithium difluoro (oxalato) borate, and lithium hexafluoroantimonate. In some embodiments, the lithium ion electrolyte salt can be selected from the group consisting essentially of lithium hexafluorophosphate, lithium perchlorate, lithium hexafluoroarsenate, lithium tetrafluoroborate, lithium trifluoromethane sulfonate, lithium bis(fluorosulfonyl)imide, lithium bis(trifluoromethanesulfonyl)imide, lithium bis(oxalato)borate, lithium bis(pentafluoroethylsulfonyl)imide, lithium tris(trifluoromethylsulfonyl)methide, lithium trifluoro tris(pentafluoroethyl)phosphate, lithium hexafluoroisopropoxide, lithium malonate borate, lithium difluoro(oxalato) borate, lithium hexafluoroantimonate, and a mixture thereof.

The organic solvent can comprise one or more of a nitrile, a carbonate, a borate, an ester, an ether, a sulfone, a sulfide, an acetal, a phosphite, and a phosphate. In some embodiments, the organic solvent can be selected from the group consisting essentially of nitriles, carbonates, borates, esters, ethers, sulfones, sulfides, acetals, phosphites, phosphates, and mixtures thereof. The nitrile can comprise one or more of acetonitrile, butyronitrile, valeronitrile, hexanenitrile, and 3-methoxypropionitrile. In some embodiments, the nitrile can be selected from the group consisting essentially of 3-methoxypropionitrile, acetonitrile, butyronitrile, valeronitrile, hexanenitrile, and a mixture thereof. The carbonate can comprise one of ethylene carbonate, propylene carbonate, dimethyl carbonate, diethyl carbonate, ethyl methyl carbonate, a fluorinated carbonate, and methyl trifluoroethyl carbonate. In some embodiments, the organic carbonate solvent can be selected from the group consisting essentially of ethylene carbonate, propylene carbonate, dimethyl carbonate, diethyl carbonate, ethyl methyl carbonate, a fluorinated carbonate, methyl trifluoroethyl carbonate, and a mixture thereof. The phosphite can comprise one or more of tris(trialkylsilyl) phosphite, tris(trimethylsilyl) phosphite, tris(triethylsilyl) phosphite, and tris(tripropylsilyl) phosphite. In some embodiments, the phosphite can be selected from the group consisting essentially of tris(trialkylsilyl) phosphite, tris(trimethylsilyl) phosphite, tris(triethylsilyl) phosphite, tris(tripropylsilyl) phosphite, and a mixture thereof. The phosphate can comprise one or more of tris(trialkylsilyl) phosphate, tris(trimethylsilyl) phosphate, tris(triethylsilyl) phosphate, and tris(tripropylsilyl) phosphate. In some embodiments, the phosphate solvent can be selected from the group consisting essentially of tris(trialkylsilyl) phosphate, tris(trimethylsilyl) phosphate, tris(triethylsilyl) phosphate, tris(tripropylsilyl) phosphate, and a mixture thereof. The borate can comprise one or more of tris(trialkylsilyl) borate, tris(trimethyl silyl)borate, tris(triethylsilyl)borate, and tris(tripropyl silyl)borate. In some embodiments, the borate can be selected from the group consisting essentially of tris(trialkylsilyl) borate, tris(trimethyl silyl)borate, tris(triethyl silyl)borate, tris(tripropylsilyl) borate, and a mixture thereof.

The organic solvent can be fluorinated. The organic solvent can comprise one or more of a fluorinated nitrile, a fluorinated carbonate, a fluorinated borate, a fluorinated ester, a fluorinated ether, a fluorinated sulfone, a fluorinated sulfide, a fluorinated acetal, a fluorinated phosphite, and a fluorinated phosphate. In some embodiments, the organic solvent can be selected from the group consisting essentially of a fluorinated nitrile, a fluorinated carbonate, a fluorinated borate, a fluorinated ester, a fluorinated ether, a fluorinated sulfone, a fluorinated sulfide, a fluorinated acetal, a fluorinated phosphite, a fluorinated phosphate, and a mixture thereof. The fluorinated carbonate can comprise one or more of bis (2,2,2-trifluoroethyl) carbonate, and 3,3,3-trifluoropropylene carbonate. In some embodiments, the fluorinated carbonate can be selected from the group consisting essentially of bis (2,2,2-trifluoroethyl) carbonate, 3,3,3-trifluoropropylene carbonate, and a mixture thereof.

The organic solvent can comprise one or more of a vinylene carbonate, a fluoroethylene carbonate, a lithium difluoro(oxalato)borate, a butylsulfide, a tris-hexafluoroisopropyl phosphate, a tris(trimethylsilyl) phosphite, and a lithium nitrate. In some embodiments, the organic can be selected from the group consisting essentially of vinylene carbonate, fluoroethylene carbonate, lithium difluoro(oxalato)borate, butyl sulfide, tris hexafluoroisopropyl phosphate, tris(trimethylsilyl) phosphite, lithium nitrate, and a mixture thereof.

The organic solvent can comprise an ester. The organic solvent can one or more of γ-butyrolactone, ethyl acetate, ethyl propionate, methyl propionate, methyl butyrate, ethyl butyrate, propyl butyrate, butyl butyrate, and 1,3-dioxolane. In some embodiments, the organic solvent can be selected from the group of esters consisting essentially of γ-butyrolactone, ethyl acetate, ethyl propionate, methyl propionate, methyl butyrate, ethyl butyrate, propyl butyrate, butyl butyrate, 1,3-dioxolane, and a mixture thereof.

The organic solvent can comprise an ether. The organic solvent can be an ether comprising one or more of diglyme and hydrofluoroether. In some embodiments, the organic solvent can be selected from the group ethers consisting essentially of diglyme, hydrofluoroether, and a mixture thereof.

The organic solvent can comprise an acetal. The organic solvent can comprise 1,3-dioxolane. In some embodiments, the organic solvent can be selected from the group consisting essentially of 1,3-dioxolane, diglyme, hydrofluoroether, and a mixture thereof.

The organic solvent can comprise a sulfone. The sulfone can comprise one or more of ethylmethyl sulfone, 2,2,2-trifluoroethylmethyl sulfone, and ethyl-sec-butyl sulfone. In some embodiments, the sulfone solvent can be selected from the group consisting of ethylmethyl sulfone, 2,2,2-trifluoroethylmethyl sulfone, ethyl-sec-butyl sulfone, and a mixture thereof.

The electrolyte can comprise a room temperature ionic liquid electrolyte. The room temperature ionic liquid electrolyte can comprise an electrolyte salt dissolved in a room temperature ionic liquid. The room temperature ionic liquid can comprise one or more cations and one or more anions. The one or more cations can be imidazolium, pyridinium, pyrrolidinium, phosphonium, ammonium or a mixture thereof. The one or more anions can be $BF_4^-$, $PF_6^-$, $CF_3SO_3^-$, $N(CF_3SO_2)_2^-$, $(C_4F_9)_3PF_3^-$, or a mixture thereof. The room temperature ionic liquid can comprise a cation selected from the group of cations consisting essentially of imidazolium, pyridinium, pyrrolidinium, phosphonium, ammonium, N-ethyl-N,N-dimethyl-2-methoxyethyl ammonium, 1-butyl-1methyl-pyrrolidinium, 1-ethyl-3-methylimidazolium, 1-methyl-3-propylpyrrolidinium, and a mixture thereof. The room temperature ionic liquid can comprise a cation selected from the group of anions consisting essentially of $BF_4^-$, $PF_6^-$, $CF_3SO_3^-$, $(C_4F_9)_3PF_3^-$, $N(CF_3SO_2)_2^-$, tris(pentafluoroethyl)trifluorophosphate), bis(trifluoromethylsulfonyl) imide), bis(fluorosulfonyl)imide, and a mixture thereof.

The electrolyte can comprise a polymeric electrolyte. The polymeric electrolyte can generally comprise a polymeric material having a polymeric backbone having an electrolyte salt incorporated into the polymeric backbone. The polymeric material can comprise a homopolymer, copolymer, block copolymer, a polymeric alloy or combination thereof. The polymeric material and/or polymeric backbone can comprise one or more of a polyethylene oxide, a polyacrylonitrile, a polymethyl methacrylate, a polyvinylidene fluoride, a polyvinylidene fluoride, and a hexafluoropropylene. In some embodiments, the polymeric material can be selected from the group consisting essentially of polyethylene oxide, polyacrylonitrile, polymethyl methacrylate, polyvinylidene fluoride, polyvinylidene fluoride, hexafluoropropylene, or a mixture or combination thereof. In some embodiments, the electrolyte can be a polymeric electrolyte gel comprising one or more electrolyte salts, one or more polymeric materials and one or more solvents.

The electrolyte can be one or more of an ion conducting electrolyte and solid electrolyte. The one or more of the ion conducting electrolyte and solid electrolyte can comprise one or more of a metal oxide, a metal fluoride, a Garnet ion conductor, a sodium super ionic conductor, a lithium super ionic conductor, a sulfide having a lithium super ionic conductor structure, and a lithium phosphorous nitrogen ion conductor. In some embodiments, the one or more of the ion conducting electrolyte and solid electrolyte can be selected from the group consisting essentially of metal oxides, metal fluorides, Garnet ion conductors, sodium super ionic conductors, lithium super ionic conductors, sulfides having a lithium super ionic conductor structure, lithium phosphorous nitrogen ion conductors, and mixtures thereof. Furthermore, the solid electrolyte can comprise one or more $LiAlO_x$ (where x is from about 1.75 to about 6.5), $LiAlF_x$ (where x is from about 1.75 to about 6.5), and $Li_xNbO_y$ (where x is from about 1 to about 5 and y is from about 3 to about 5). In some embodiments, the solid electrolyte can be selected from the group consisting essentially of $LiAlO_x$ (where x is from about 1.75 to about 6.5), $LiAlF_x$ (where x is from about 1.75 to about 6.5), $Li_xNbO_y$ (where x is from about 1 to about 5 and y is from about 3 to about 5), and a mixture thereof. In some embodiments, the Garnet ion conductor can comprise one or more $Li_5La_3Ta_2O_{12}$, $Li_7La_3Zr_2O_{12}$, and $Li_3Ln_3Te_2O_{12}$ where Ln is a lanthanide. In some embodiments, the Garnet ion conductor can be selected from the group consisting essentially of $Li_5La_3Ta_2O_{12}$, $Li_7La_3Zr_2O_{12}$, $Li_3Ln_3Te_2O_{12}$ where Ln is a lanthanide, and a mixture thereof. The lithium super ionic conductor can comprise one or more of $Li_{3.5}Zn_{0.25}GeO_4$, $Li_{3.4}Si_{0.4}V_{0.6}O_4$, $Li_2ZnGeO_4$, and $Li_{2+2x}Zn_{1-x}GeO_4$, where x has a value from about −0.36 to about 0.87. In some embodiments, the lithium super ionic conductor can be selected from the group consisting essentially of $Li_{3.5}Zn_{0.25}GeO_4$, $Li_{3.4}Si_{0.4}V_{0.6}O_4$, $Li_2ZnGeO_4$, $Li_{2+2x}Zn_{1-x}GeO_4$ (where x has a value from about −0.36 to about 0.87), and a mixture thereof. The sulfide having a lithium super ionic conductor structure can comprise one or more of $Li_{3.25}Ge_{0.25}P_{0.75}S_4$, $Li_{4-x}Si_{1-y}P'_yS_4$, $Li_{4-x}Si_{1-y}Al_yS_4$, $Li_{4-x}Si_{1-y}Zn_yS_4$, $Li_{4-x}Si_{1-y}Ga_yS_4$, $Li_{4-x}Ge_{1-y}P_yS_4$, $Li_{4-x}Ge_{1-y}Al_yS_4$, $Li_{4-x}Ge_{1-y}Zn_yS_4$, and $Li_{4-x}Ge_{1-y}Ga_yS_4$. In some embodiments, the sulfide having a lithium super ionic conductor structure can be selected from the group consisting essentially of $Li_{3.25}Ge_{0.25}P_{0.75}S_4$, $Li_{4-x}Si_{1-y}P_yS_4$, $Li_{4-x}Si_{1-y}Al_yS_4$, $Li_{4-x}Si_{1-y}Zn_yS_4$, $Li_{4-x}Si_{1-y}Ga_yS_4$, $Li_{4-x}Ge_{1-y}P_yS_4$, $Li_{4-x}Ge_{1-y}Al_yS_4$, $Li_{4-x}Ge_{1-y}Zn_yS_4$, $Li_{4-x}Ge_{1-y}Ga_yS_4$, and a mixture thereof.

Functional Coatings on Cell Components

The anode and cathode active materials and the separator can have one or more coating materials. The coating materials can substantially coat the surfaces of one or more anode active materials, the cathode active materials and the separator. The coating materials can be applied to any one or more of the anode active materials, the cathode active materials and the separator in the form of a continuous or discontinuous coating layer. In some embodiments, the coating materials can be applied to any one or more of the anode active materials, the cathode active materials and the separator in the form of one or more stacked layers. The coating materials are typically applied to any one or more of the anode active materials, the cathode active materials and the separator by one of atomic layer deposition, molecular layer deposition or a combination of atomic and molecular layer depositions. In some embodiments, the coating materials are typically applied to any one or more of the anode active materials, the cathode active materials and the separator by one of chemical vapor deposition, physical vapor deposition, chemical deposition, electrochemical deposition, spraying deposition, spin coating deposition, and atomic layer deposition, molecular layer deposition, or a combination thereof. While not wanting to be bound by any theory, it is generally believed that the application of the coating materials to any one or more of the anode active materials, the cathode active materials and the separator can enhance one or more of protection, stability and conductivity of the respective anode, cathode and/or separator. It is further believed that the application of the coating materials to any one or more of the anode active materials, the cathode active materials and the separator can enhance one or more of the electrochemical performance and strengthen long-term cycle life and storage live of an electrochemical energy storage device.

The one or more coating materials can be a functional coating material. The functional coating material can comprise one or more of a metal oxide, a metal nitride, a metal sulfide, a metal phosphate, a metal fluoride, a conductive polymer, an organic-inorganic hybrid polymer, an ion conducting electrolyte and solid electrolyte. Moreover, functional coating material can be selected from the group consisting essentially of metal oxides, metal nitrides, metal sulfides, metal phosphates, metal fluoride, conductive polymers, organic-inorganic hybrid polymers, ion conducting electrolytes, solid electrolytes, and mixtures thereof.

In some embodiments, the functional coating material can be a metal oxide. In some embodiments, the metal oxide can comprise one or more of $Al_2O_3$, $BaTiO_3$, $BaSrTiO_3$, $Bi_2O_3$, $Co_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, and $ZrO_2$. According to some embodiments, the metal oxide can be selected from the group consisting essentially of $Al_2O_3$, $BaTiO_3$, $BaSrTiO_3$, $Bi_2O_3$, $CO_2O_3$, $FeO_x$, $Fe_3O_4$, $Ga_2O_3$, $HfO_2$, $In_2O_3$, $IrO_2$, $MnO_2$, $MoO_2$, $NiO$, $Ni(OH)_2$, $RuO_2$, $SiO_2$, $SnO_2$, $TiO_2$, $V_2O_5$, $Yb_2O_3$, $ZnO$, $ZrO_2$, and mixtures thereof.

In some embodiments, the functional coating material can be a metal nitride. In some embodiments, the metal nitride can comprise one or more of $TiN$, $TaN$, $HfN$, $Hf_3N_4$, $Zr_3N_4$, $ZrN_x$, and $NbN$. In accordance with some embodiments, the metal nitride can be selected from the group consisting essentially of $TiN$, $TaN$, $HfN$, $Hf_3N_4$, $Zr_3N_4$, $ZrN_x$, $NbN$, and mixtures thereof.

In some embodiments, the functional coating material can be a metal sulfide. In some embodiments, the metal sulfide can comprise one or more $PbS$, $ZnS$, $CaS$, $BaS$, $SrS$, $Cu_xS$, $CdS$, $In_2S_3$, $WS_2$, $TiS_2$, $Sb_2S_3$, $SnS$, $GaS_x$, $GeS$, $MoS_2$, and $Li_2S$. In accordance to some embodiments, the metal sulfide can be selected from the group consisting essentially of $PbS$, $ZnS$, $CaS$, $BaS$, $SrS$, $Cu_xS$, $CdS$, $In_2S_3$, $WS_2$, $TiS_2$, $Sb_2S_3$, $SnS$, $GaS_x$, $GeS$, $MoS_2$, $Li_2S$, and mixtures thereof.

In some embodiments, the functional coating material can be a metal phosphate. In some embodiments, the metal phosphate can comprise one or more of $AlPO_4$, $TiPO_4$, $FeAlPO_4$, $SiAlPO_4$, $CoAlPO_4MnAlPO_4$, $Li_3PO_4$, and $NaH_2PO_4$. In accordance with some embodiments, the metal phosphate can be selected from the group consisting essentially of $AlPO_4$, $TiPO_4$, $FeAlPO_4$, $SiAlPO_4$, $CoAlPO_4MnAlPO_4$, $Li_3PO_4$, $NaH_2PO_4$, and mixtures thereof.

In some embodiments, the functional coating material can be a metal fluoride. In some embodiments, the metal fluoride can comprise $AlF_3$.

In some embodiments, the functional coating material can be an ion conducting polymer. In some embodiments, the ion conducting polymer can comprise one or more of a polyimide polymer, a polyfluorene polymer, a polyphenylene polymer, a polypyrene polymer, a polyazulene polymer, a polynaphthalene polymer, a polyacetylene polymer, a poly(p-phenylene vinylene) polymer, a polypyrrole polymer, a polycarbazole polymer, a polyindole polymer, a polyazepine polymer, a polyaniline polymer, a polythiophene polymer, a poly(3,4-ethylenedioxythiophene) polymer, a poly(p-phenylene sulfide) polymer, and a poly(3,4-ethylenedioxythiophene) polymer. In accordance with some embodiments, the ion conducting polymer can be selected from the group consisting essentially of polyimides, polyfluorenes, polyphenylenes, polypyrenes, polyazulenes, polynaphthalenes, polyacetylenes, poly(p-phenylene vinylene)s, polypyrroles, polycarbazoles, polyindoles, polyazepines, polyanilines, polythiophenes, poly(3,4-ethylenedioxythiophene)s, poly(p-phenylenesulfide)s, poly(3,4-ethylenedioxythiophenes), and mixtures thereof. It can be appreciated that ion conducting polymer can be a homopolymer, a copolymer, an polymeric alloy, a polymeric mixture, or any combination thereof one or more of a polyimide, polyfluorene, polyphenylene, polypyrene, polyazulene, polynaphthalene, polyacetylene, poly(p-phenylene vinylene), polypyrrole, polycarbazole, polyindole, polyazepine, polyaniline, polythiophene, poly(3,4-ethylenedioxythiophene), poly(p-phenylene sulfide), and poly(3,4-ethylenedioxythiophene).

In some embodiments, the functional coating material can be an organic-inorganic hybrid conductive polymer comprising one or more of poly(zinc glycol) (zincone), ZnO blended zincone, lithium-doped zincone, poly(aluminum glycol) (alucone), $Al_2O_3$ blended zincone, and lithium-doped alucone, poly(titanium glycol), lithium-doped poly (titanium glycol), poly(titanium propanol), and lithium-doped poly(titanium propanol). In some embodiments, the organic-inorganic hybrid conductive polymer can be selected from group consisting essentially of poly(zinc glycol) (zincone), ZnO blended zincone, lithium-doped zincone, poly(aluminum glycol) (alucone), $Al_2O_3$ blended zincone, lithium-doped alucone, poly(titanium glycol), lithium-doped poly(titanium glycol), poly(titanium propanol), and lithium-doped poly(titanium propanol) and mixtures thereof.

In some embodiments, the functional coating material can be an ion conducting electrolyte. In some embodiments, the ion conducting electrolyte can comprise one or more of a lithium metal oxide, a lithium metal fluoride, a Garnet ion conductor, a sodium super ionic conductor, a lithium super ionic conductor, a sulfide having lithium super ionic conductor structure, and a lithium phosphorous nitrogen ion conductor. In accordance with some embodiments, the ion conducting electrolyte can be selected from the group consisting essentially of lithium metal oxides, lithium metal fluorides, Garnet ion conductors, sodium super ionic conductors, lithium super ionic conductors, sulfides having lithium super ionic conductor structures, lithium phosphorous nitrogen ion conductors, and mixtures thereof.

In some embodiments, the functional coating material can be a solid electrolyte. In some embodiments the solid electrolyte can comprise one or more of a lithium metal oxide, a lithium metal fluoride, a Garnet ion conductor, a sodium super ionic conductor, a lithium super ionic conductor, a sulfide having lithium super ionic conductor structure, and a lithium phosphorous nitrogen ion conductor. In accordance with some embodiments, the solid electrolyte can be selected from the group consisting essentially of lithium metal oxides, lithium metal fluorides, Garnet ion conductors, sodium super ionic conductors, lithium super ionic conductors, sulfides having lithium super ionic conductor structures, lithium phosphorous nitrogen ion conductors, and mixtures thereof. In some embodiments, the solid electrolyte can comprise one or more of a metal oxide, a metal fluoride, a metal sulfide, an alkali metal oxide, an alkali metal fluoride, an alkali metal sulfide, an alkaline earth metal oxide, an alkaline earth metal fluoride, and an alkaline earth metal sulfide. In accordance with some embodiments, the solid electrolyte can be selected from the group consisting essentially of metal oxides, metal fluorides, metal sulfides, alkali metal oxides, alkali metal fluorides, alkali metal sulfides, alkaline earth metal oxides, alkaline earth metal fluorides, alkaline earth metal sulfides, and mixtures thereof. In some embodiments, the solid electrolyte can comprise one or more of $M_zAlO_y$, $M_zAlF_y$, $M_zWO_y$, and $M_zWF_y$, where M is one of alkali metal, z has a value from about 0.5 to about 10 and y has a value from about 1.75 to about 6.5. In accordance with some embodiments, the solid electrolyte can be selected from the group consisting essentially of $M_zAlO_y$, $M_zAlF_y$, $M_zWO_y$, $M_zWF_y$, and mixture thereof, where M is one of alkali metal, z has a value from about 0.5 to about 10 and y has a value from about 1.75 to about 6.5. In some embodiments, the solid electrolyte can comprise one or more of $LiAlO_w$ (where w is from about 1.75 to about 6.5), $LiAlF_x$ (where x is from about 1.75 to about 6.5), $Li_yNbO_z$ (where y is from about 1 to about 5 and z is from about 3 to about 5), and LiPON. In accordance with some embodiments, the solid electrolyte can be selected from the group consisting essentially of $LiAlO_w$ (where w is from about 1.75 to about 6.5), $LiAlF_x$ (where x is from about 1.75 to about 6.5), $Li_yNbO_z$ (where y is from about 1 to about 5 and z is from about 3 to about 5), LiPON, and mixtures thereof.

In some embodiments the functional coating material can be a Garnet solid electrolyte. The Garnet solid electrolyte can comprise one or more of $Li_5La_3Ta_2O_{12}$, $Li_7La_3Zr_2O_{12}$, $Li_3Sc_3Te_2O_{12}$, $Li_3Y_3Te_2O_{12}$, $Li_3La_3Te_2O_{12}$, $Li_3Ce_3Te_2O_{12}$, $Li_3Pr_3Te_2O_{12}$, $Li_3Nd_3Te_2O_{12}$, $Li_3Pm_3Te_2O_{12}$, $Li_3Sm_3Te_2O_{12}$, $Li_3Eu_3Te_2O_{12}$, $Li_3Gd_3Te_2O_{12}$, $Li_3Tb_3Te_2O_{12}$, $Li_3Dy_3Te_2O_{12}$, $Li_3Ho_3Te_2O_{12}$, $Li_3Er_3Te_2O_{12}$, $Li_3Tm_3Te_2O_{12}$, $Li_3Yb_3Te_2O_{12}$, and $Li_3Lu_3Te_2O_{12}$. In some embodiments, the Garnet solid electrolyte can be selected from the group consisting essentially of $Li_5La_3Ta_2O_{12}$, $Li_7La_3Zr_2O_{12}$, $Li_3Sc_3Te_2O_{12}$, $Li_3Y_3Te_2O_{12}$, $Li_3La_3Te_2O_{12}$, $Li_3Ce_3Te_2O_{12}$, $Li_3Pr_3Te_2O_{12}$, $Li_3Nd_3Te_2O_{12}$, $Li_3Pm_3Te_2O_{12}$, $Li_3Sm_3Te_2O_{12}$, $Li_3Eu_3Te_2O_{12}$, $Li_3Gd_3Te_2O_{12}$, $Li_3Tb_3Te_2O_{12}$, $Li_3Dy_3Te_2O_{12}$, $Li_3Ho_3Te_2O_{12}$, $Li_3Er_3Te_2O_{12}$, $Li_3Tm_3Te_2O_{12}$, $Li_3Yb_3Te_2O_{12}$, $Li_3Lu_3Te_2O_{12}$, and mixtures thereof.

In some embodiments the functional coating material can be a lithium super ionic conductor. In accordance with some embodiments, the lithium super ionic conductor can comprise one or more of $Li_{3.5}Zn_{0.25}GeO_4$, $Li_{3.4}Si_{0.4}V_{0.6}O_4$, $Li_2ZnGeO_4$, and $Li_{2+2x}Zn_{1-x}GeO_4$ (where x is from about −0.36 or more to about 0.87 or less). In some embodiments, the lithium super ionic conductor can be selected from the group consisting essentially of $Li_{3.5}Zn_{0.25}GeO_4$, $Li_{3.4}Si_{0.4}V_{0.6}O_4$, $Li_2ZnGeO_4$, $Li_{2+2x}Zn_{1-x}GeO_4$ (where x is from about −0.36 or more to about 0.87 or less), and mixtures thereof.

In some embodiments, the functional coating can be a lithium sulfide super ionic conductor. The lithium sulfide super ionic conductor can comprise one or more of $Li_{10}GeP_2S_{12}$, $Li_{3.25}Ge_{0.25}P_{0.75}S_4$, $Li_{4-x}Si_{1-y}P_yS_4$, $Li_{4-x}Si_{1-y}Al_yS_4$, $Li_{4-x}Si_{1-y}Zn_yS_4$, $Li_{4-x}Si_{1-y}Ga_yS_4$, $Li_{4-x}Ge_{1-y}P_yS_4$, $Li_{4-x}Ge_{1-y}Al_yS_4$, $Li_{4-x}Ge_{1-y}Zn_yS_4$, and $Li_{4-x}Ge_{1-y}Ga_yS_4$. In some embodiments, the lithium sulfide super ionic conductor can be selected from the group consisting essentially of $Li_{10}GeP_2S_{12}$, $Li_{3.25}Ge_{0.25}P_{0.75}S_4$, $Li_{4-x}Si_{1-y}P_yS_4$, $Li_{4-x}Si_{1-y}Al_yS_4$, $Li_{4-x}Si_{1-y}Zn_yS_4$, $Li_{4-x}Si_{1-y}Ga_yS_4$, $Li_{4-x}Ge_{1-y}P_yS_4$, $Li_{4-x}Ge_{1-y}Al_yS_4$, $Li_{4-x}Ge_{1-y}Ga_yS_4$ (where, x=0.6±0.2, y=0.6±0.2), and mixtures thereof.

Current Collector

The anode electrode can have an anode current collector. The anode current collector can generally comprise one of aluminum, nickel, titanium, stainless steel, carbon coated aluminum, carbon coated nickel, carbon coated titanium, or carbon coated stainless steel.

The cathode electrode can have a cathode current collector. The cathode current collector can commonly comprise one of aluminum, nickel, titanium, stainless steel, carbon coated aluminum, carbon coated nickel, carbon coated titanium, or carbon coated stainless steel.

Anode Electrode

The anode electrode typically comprises an anode current collector, an anode polymeric binder, an anode conductive carbon, and one or more anode active materials. The one or more anode active materials can store energy by one of electrostatically, electrochemically or a combination of electrostatically and electrochemically. The anode conductive carbon can be selected from the group consisting essentially of carbon black, conductive graphite, carbon nanotube, graphene, and a mixture thereof.

In accordance with some embodiments, the anode can have from about 80% to about 98 wt % of the anode active material, from about 1% to about 10 wt % of the anode conductive carbon, and from about 1% to about 10 wt % of the anode polymeric binder.

Cathode Electrode

The cathode electrode typically comprises a cathode current collector, a cathode polymeric binder, a cathode conductive carbon, and one or more cathode active materials. The one or more cathode active materials can store energy by one of electrostatically, electrochemically or a combination of electrostatically and electrochemically. The cathode conductive carbon can be selected from the group consisting essentially of carbon black, conductive graphite, carbon nanotube, graphene, and a mixture thereof.

In accordance with some embodiments, the cathode contains one or more cathode active material that can store energy electrostatically or electrochemically or both, a polymeric binder, a conductive carbon selected from the group consisting of carbon black, conductive graphite, carbon nanotube, graphene, or a mixture thereof, and a current collector.

In accordance with some embodiments, the cathode can have from about 80% to about 98 wt % of the cathode active material, from about 1% to about 10 wt % of the cathode conductive carbon, and from about 1% to about 10 wt % of the cathode polymeric binder.

Carbon Black

The anode and/or cathode conductive carbon can comprise carbon black. The carbon black can comprise one or more of carcass grade carbon black, furnace grade carbon black, hard carbon black, soft carbon black, thermal carbon black, acetylenic thermal carbon black, channel black, lamp black, carbon nanotube, and graphene. In some embodiments, the carbon black can be selected from the group consisting essentially of carcass grade carbon black, furnace grade carbon black, hard carbon black, soft carbon black, thermal carbon black, acetylenic thermal carbon black, channel black, lamp black, carbon nanotube, graphene, and mixtures thereof.

Conductive Graphite

The anode and/or cathode conductive carbon can comprise conductive graphite. In some embodiments, the conductive graphite can comprise one or more of natural graphite, crystalline flack graphite, amorphous graphite, pyrolytic graphite, graphene, lump graphite, and graphite fiber. In some embodiments, the conductive graphite can be selected from the group consisting essentially of natural graphite, crystalline flack graphite, amorphous graphite, pyrolytic graphite, graphene, lump graphite, graphite fiber, and mixtures thereof.

Binder

The anode and/or cathode polymeric binders can comprise one or more of a poly(tetrafluoroethylene) polymer, poly(vinylidene fluoride) homopolymer, a poly(vinylidene fluoride) co-polymer, a styrene-butadiene rubber/carboxymethylcellulose aqueous copolymer, and a lithium poly (acrylic acid) aqueous polymer. In some embodiments, the anode and/or cathode polymeric binders can be selected from the group consisting of poly(tetrafluoroethylene) polymers, poly(vinylidene fluoride) homopolymers, poly(vinylidene fluoride) co-polymers, styrene-butadiene rubber/carboxymethylcellulose aqueous copolymers, lithium poly (acrylic acid) aqueous polymers, and mixtures thereof.

Enclosure or Case

The electrochemical energy storage device can be in the form of a cell and/or a battery. The cell and/or battery can comprise at least one anode, at least one cathode, at least one separator, and an electrolyte in ionic contact with the at least one anode, the at least one cathode and the at least one separator. The electrochemical energy storage device can also comprise enclosure or case. The enclosure and/or case defines a void volume. The void volume is generally occupied and/or filled by the at least one anode, the at least one cathode, the at least one separator, and the electrolyte. The enclosure and/or case commonly comprise one of aluminum laminated film pouch, or a metal case. In some embodiments, the case for the energy storage device comprises a metal selected from the group consisting essentially of aluminum, nickel, titanium, and stainless steel.

EXAMPLES

The following examples are provided to illustrate certain embodiments of the disclosure and are not to be construed as limitations on the disclosure, as set forth in the appended claims. All parts and percentages are by weight unless otherwise specified.

Near Zero-Volt Storage Capable, Safe, Long Cycle Life $Li_4Ti_5O_{12}$ Anodes $Li_4Ti_5O_{12}$ anode active materials generally performed better than graphite anode materials. This is believed to be due to the structural stability of $Li_4Ti_5O_{12}$ compared to graphite. Moreover, $Li_4Ti_5O_{12}$ typically has a greater cycle life and better safety performance than graphite.

$Li_4Ti_5O_{12}$ is a spinel and belongs to the cubic space group Fd3m. It also reversibly intercalates lithium according to equation (1):

$$Li_4Ti_5O_{12}+3Li^++3e^-\leftrightarrow Li_7Ti_5O_{12} \quad (1)$$

It is believed that the $Ti^{4+}/Ti^{3+}$ redox couple of $Li_4Ti_5O_{12}$ is responsible for a theoretical capacity of 175 mAh/g. The $Ti^{4+}/Ti^{3+}$ redox couple is also believed to have a substantially flat cell potential from about 1.55V versus. $Li/Li^+$.

Anodes comprising $Li_4Ti_5O_{12}$ commonly has greater redox potential than conventional graphite electrodes. $Li_4Ti_5O_{12}$. For example, the reduction potential of $Li_4Ti_5O_{12}$ is typically greater than the reduction potential of most organic electrolytes which are typically no more than about 0.8V versus $Li/Li^+$. Hence, the formation of a solid electrolyte interface film can be avoided in electrochemical energy cells having a $Li_4Ti_5O_{12}$ anode. This is advantageous because it can obviate concerns regarding solid electrolyte interface film dissolution when one or more of discharging and storing an electrochemical cell and/or battery at near zero-volts.

Compared to the prior art anode materials, $Li_4Ti_5O_{12}$ can be used with an aluminum foil current collector. This is primarily because $Li_4Ti_5O_{12}$ generally has a higher redox potential than the prior art anode materials.

$Li_4Ti_5O_{12}$ anodes can also offer extraordinary structural stability. For example, the fully lithiated and fully de-lithiated phases of $Li_4Ti_5O_{12}$ have almost no difference in the lattice parameters. As such, $Li_7Ti_5O_{12}$ undergoes substantially zero lattice strain when fully lithiated and fully de-lithiated. Thus, $Li_4Ti_5O_{12}$ exhibits an extremely stable cycle life without fragmentation or degradation. Anode materials of the prior art commonly display stress or fatigue during electrochemical cycling, such as being fully lithiated and/or fully de-lithiated.

Since the redox potential of $Li_4Ti_5O_{12}$ is sufficiently higher than that of lithium metal, neither lithium plating nor dendrite formation results during electrochemical cycling. Hence, the electrochemical cell and/or battery can undergo high charge rates without substantial safety concerns normally associated with lithium dendrite penetration through the separator causing an internal short circuit. Such internal short circuit failures are known to escalate quickly into hazardous thermal runaway events.

$Li_4Ti_5O_{12}$ has a high cycle rate, up to about 60 C rate cycling. As such, it can be a suitable anode material for high pulse power applications. Some of the attributes and/or advantages of a $Li_4Ti_5O_{12}$ anode render electrochemical energy storage device designs that possesses high energy density, fast charging capability without dendrite formation. $Li_4Ti_5O_{12}$ anodes can also offer a near zero-volt storage capability, when compared to electrochemical storage device designs based on a graphite anodes and copper current collectors.

Figure 2A:
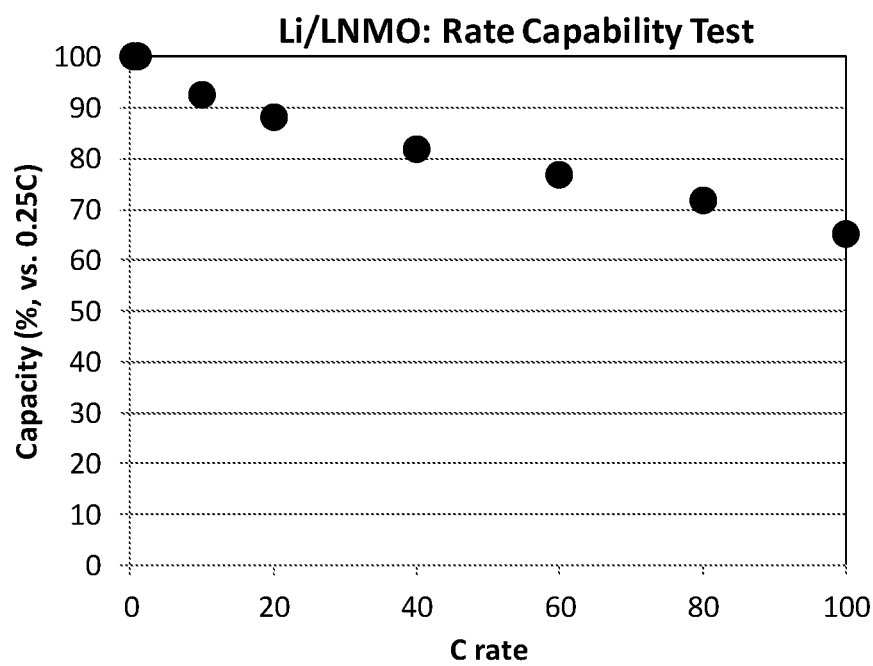
FIG. 2A depicts rate capability tests for half-cells according to some embodiments of the present disclosure.
Figure 2B:
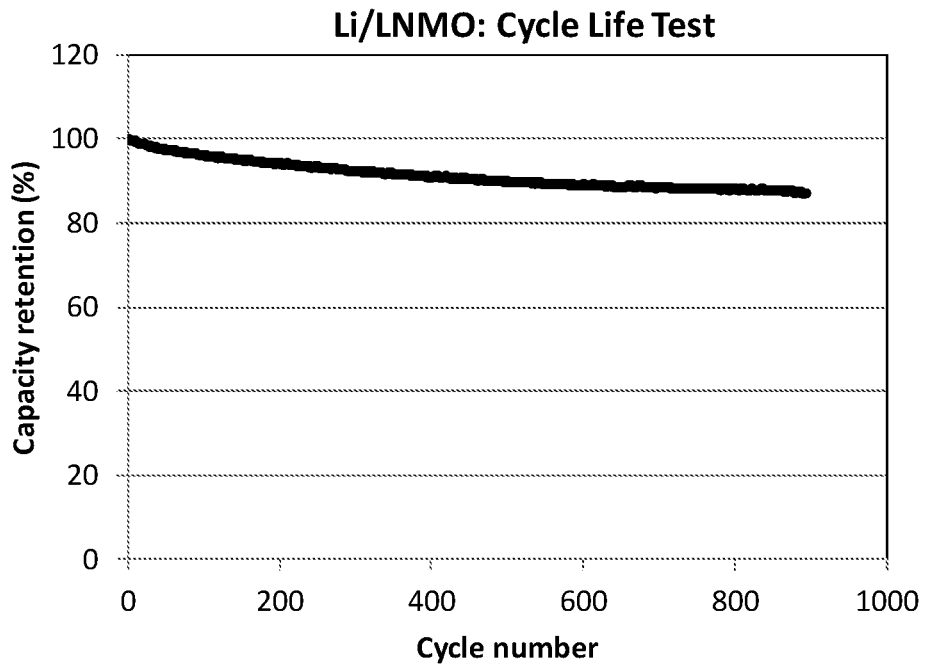
FIG. 2B depicts cycle life tests for half-cells according to some embodiments of the present disclosure.

High Voltage, High Rate, Long Cycle Life $LiNi_{0.5}Mn_{1.5}O_4$ Cathodes $LiNi_{0.5}Mn_{1.5}O_4$ cathodes offer strong performance attributes including the ability to operate near 5V vs. $Li/Li^+$ (this leads to high specific energy/power density), excellent rate capability (due to the 3D spinel structure) and long cycle life (since $Ni^{2+}/Ni^{4+}$ is the major redox couple and $Mn^{4+}$ is substantially stable, that is Jahn-Teller distortions of $LiNi_{0.5}Mn_{1.5}O_4$ are generally avoided). This leads to electrochemical cells with excellent rate capability and long cycle life (FIGS. 2A and 2B).

$Li_4Ti_5O_{12}/LiNi_{0.5}Mn_{1.5}O_4$ Cell Voltage Profiles and Cycle

Figure 3A:
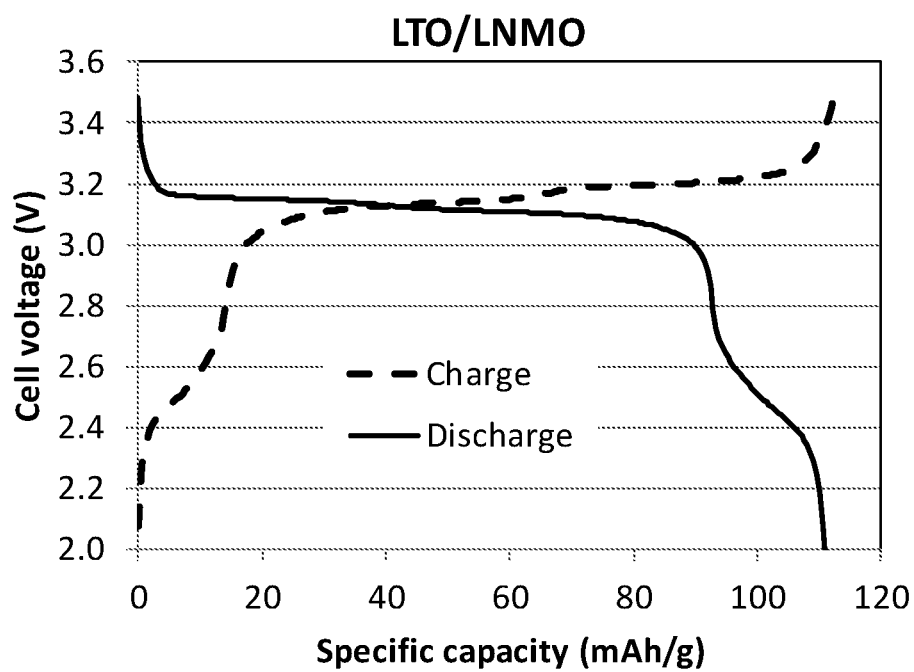
FIG. 3A depicts voltage profile tests for full cells according to some embodiments of the present disclosure.
Figure 3B:
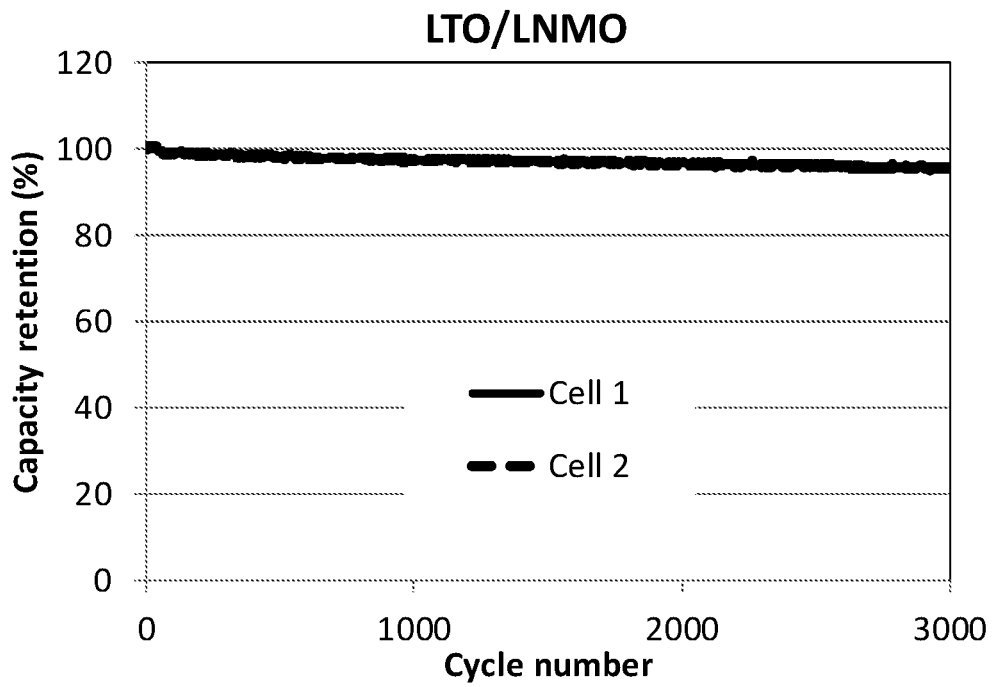
FIG. 3B depicts cycle life test for full cells according to some embodiments of the present disclosure.

FIG. 3A depicts $Li_4Ti_5O_{12}/LiNi_{0.5}Mn_{1.5}O_4$ full cell charge and full discharge voltage profiles (at C/4-rate). The $LiNi_{0.5}Mn_{1.5}O_4$ and $Li_4Ti_5O_{12}$ electrodes were each slurry-coated on aluminum foil. The aluminum foil current collector provides substantial stability at about zero volts. This $Li_4Ti_5O_{12}/LiNi_{0.5}Mn_{1.5}O_4$ couple produces a flat discharge voltage of about 3.1V at, for example, a discharge rate of about C/4. FIG. 3B shows the cycle life of $Li_4Ti_5O_{12}/LiNi_{0.5}Mn_{1.5}O_4$ full cells (1 C/2 C charge/discharge). The $Li_4Ti_5O_{12}/LiNi_{0.5}Mn_{1.5}O_4$ electrochemical couple cycled with about 95% or more capacity retention after about 3000 cycles.

Figure 4A:
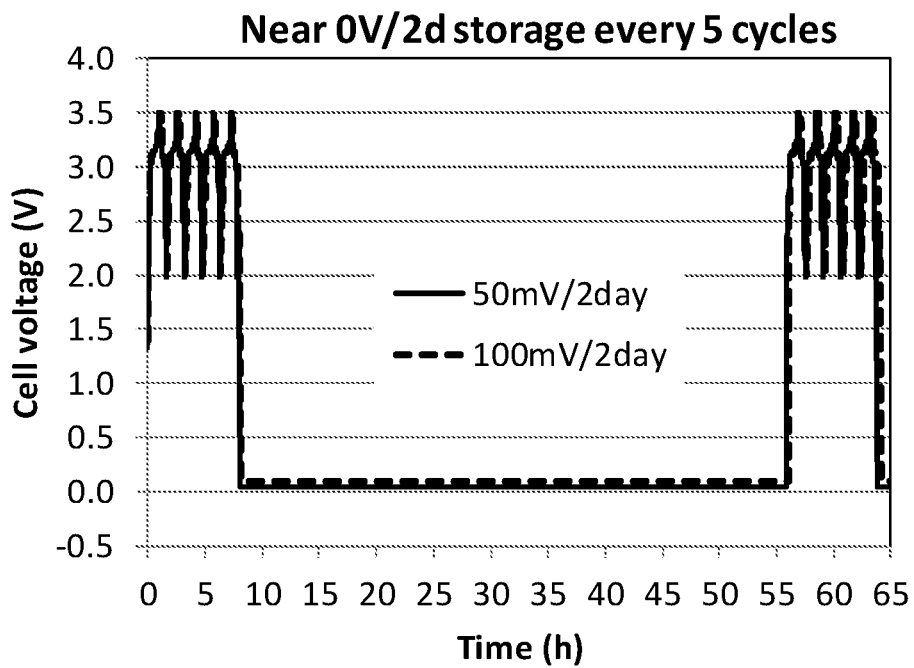
FIG. 4A depicts voltage profiles for deep discharge/storage data for full cells according to some embodiments of the present disclosure.
Figure 4B:
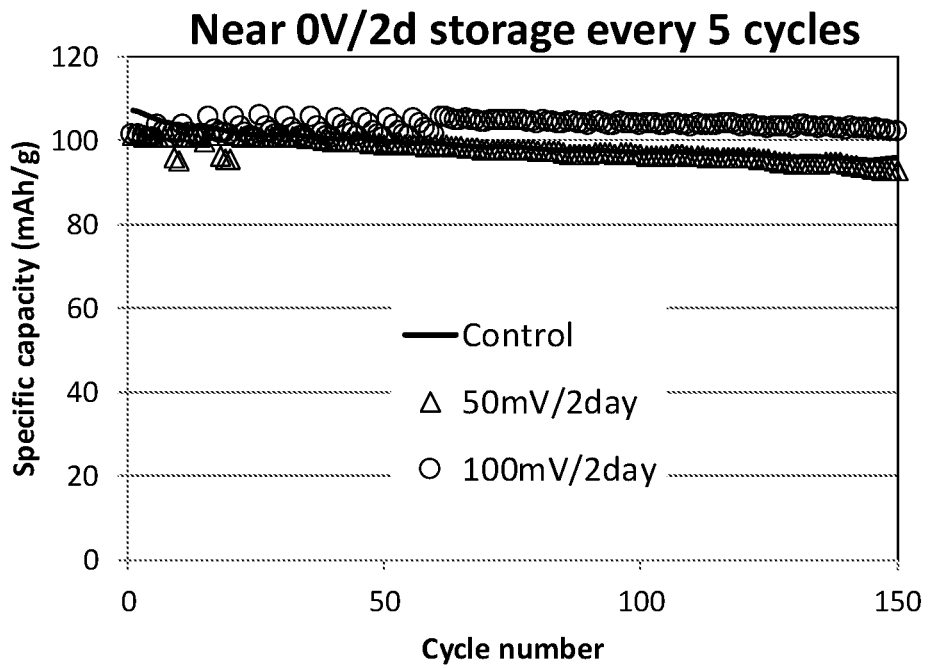
FIG. 4B depicts cell capacity versus cycle number profiles for deep discharge/storage data for full cells according to some embodiments of the present disclosure.

$Li_4Ti_5O_{12}/LiNi_{0.5}Mn_{1.5}O_4$ Cells Long-Term Near Zero-Volt Storage Capability The test scheme consisted of storage at about zero volts (about 50 mV or about 100 mV) for two days for every five normal cycles. During the about zero-volt cell storage, cell voltage was actively maintained at about zero volts through constant voltage discharges. This provided rigorous about zero volts storage with meaningful data outputs. FIG. 4A depicts cell voltages, including deep discharge to about zero volts with a storage of about two days versus time, under these testing conditions for the initial ten cycles. FIG. 4B depicts cell specific capacity (with respect to the cathode active material mass) as a function of cycle number (about two days, at about zero-volt storage for every five cycles). The cells have been cumulatively evaluated for more than about 50 days discharge and storage at about 50 mV and 100 mV, respectively. Cell performance was maintained with no capacity fade. This represents a result comparable to control cells that were cycled in a normal manner, without an extended period deep discharge and storage. The extraordinary cell deep discharge and/or deep storage resilience is believed to be due to the $Li_4Ti_5O_{12}$ anode selection. For example, to the one or more of high voltage-stable aluminum foil current collector, the inherent stability $Li_4Ti_5O_{12}$, and the substantial lack of formation of a solid electrolyte interface layer.

Near Zero-Volt Storage Comparative Study

Figure 5:
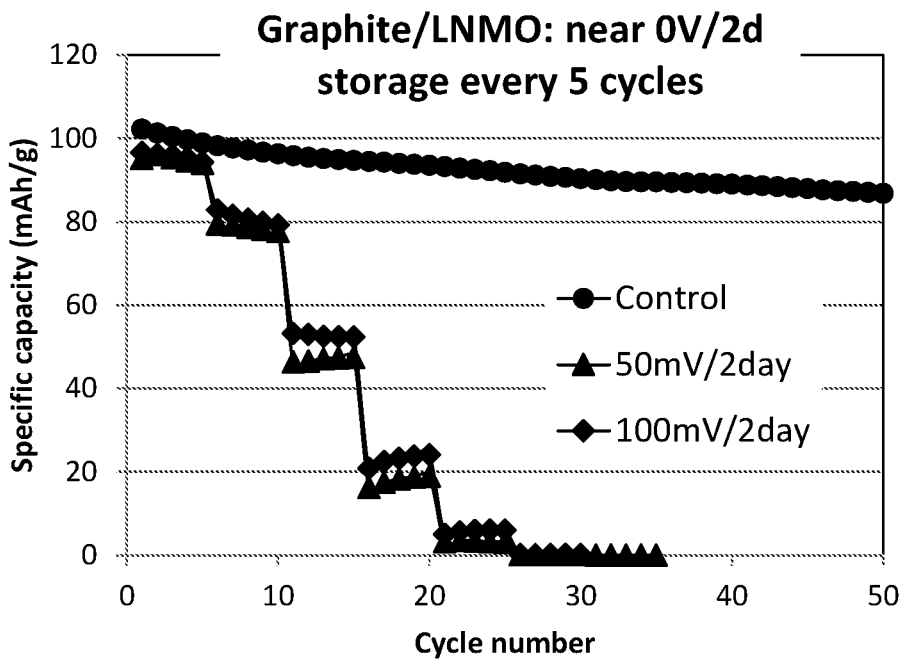
FIG. 5 depicts capacity vs. cycle number under near zero-volt storage scheme for devices according to some embodiments of the present disclosure.

For comparison purposes, an about zero volt cycling for graphite/$LiNi_{0.5}Mn_{1.5}O_4$ cells was performed. FIG. 5 depicts a control graphite/$LiNi_{0.5}Mn_{1.5}O_4$ cell with normal cycle conditions, at about zero-volt discharge and storage. The graphite/$LiNi_{0.5}Mn_{1.5}O_4$ cells experienced rapid capacity deterioration (that is, a capacity drop to zero). This is likely due to metallic copper current collector dissolution and dissolution and reformation of solid electrolyte interface films on graphite anode.

Functional Coatings on $Li_4Ti_5O_{12}$ Anode

Functional material coating on $Li_4Ti_5O_{12}$ further improved the $Li_4Ti_5O_{12}$ electrode conductivity for high pulse power applications. It also served to mitigate the $Li_4Ti_5O_{12}$ catalytic effect with electrolyte reduction on the $Li_4Ti_5O_{12}$ surface, especially at full charge (lithiated) $Li_4Ti_5O_{12}$ and elevated temperatures (of about 55 degrees Celsius). The latter effect is not a substantial issue when the cell and/or battery is stored near zero-volts, even at elevated temperatures. $Li_4Ti_5O_{12}$ catalytic effect is known to produce gaseous products from electrolyte reduction. This is not easily observed in small or rigid (packaged) cells due to the small amount of gas released. The atomic layer deposited functional coating on $Li_4Ti_5O_{12}$ improved, over the cells and/or batteries of the prior art, the ability and performance of cells and/or batteries to be stored and to operate at a fully charged state and elevated temperatures.

$Li_4Ti_5O_{12}$ anode functional material coating can be applied by one or more of atomic level, molecular level, or combination of atomic and molecular levels. The coating can be applied by one or more of chemical vapor deposition, physical vapor deposition, chemical deposition, electrochemical deposition, spraying deposition, and spin coating deposition.

$Li_4Ti_5O_{12}$ anode functional coating materials may include lithium aluminum oxide, lithium niobium oxide, lithium lanthanum titanate, and $Li_{3x}La_{(2/3)-x}TiO_3$ (with x being about 0.11) or combinations of thereof. It can be appreciated that the functional coating materials can be applied as a single layer or as a plurality of layers of one on top of another. $LiNbO_3$ and $Li_{3x}La_{(2/3)-0.11}TiO_3$ have high room temperature ionic conductivity, $10^{-5}$ S/cm and $10^{-3}$ S/cm, respectively. Thin films of these high ionic conducting solid electrolytes can enhance $Li_4Ti_5O_{12}$ rate capability and serve as a solid electrolyte interface layers. These solid electrolytes can block electronic pathways of electrolyte reduction at the fully charged (lithiated) $Li_4Ti_5O_{12}$ particle surface. Ultimately, these material enhancements can render electrodes and electrochemical cells and batteries with improved rate capability with substantially mitigated and/or eliminated $Li_4Ti_5O_{12}$ catalytic effect. These improvements can benefit $Li_4Ti_5O_{12}$ electrochemical performance.

Conductive Organic-Inorganic Hybrid Polymer Coating on $Li_4Ti_5O_{12}$ Powder.

Conductive organic-inorganic hybrid polymer coatings on $Li_4Ti_5O_{12}$ powder can: encapsulate the $Li_4Ti_5O_{12}$ a polymeric network to suppress the catalytic side reactions at the electrode/electrolyte interface; and increase $Li_4Ti_5O_{12}$ anode electronic and ionic conductivities through a conductive polymer media. This is particularly helpful since the $Li_4Ti_5O_{12}$ electronic conductivity and lithium ion diffusion coefficient are inherently low, at about $10^{-13}$ S/cm and about $10^{-13}$ S/(cm$^2 \cdot$s), respectively, at room temperature. These can increase near-zero-volt storage capable $Li_4Ti_5O_{12}/LiNi_{0.5}Mn_{1.5}O_4$ cell functional stability, with improved electrochemical performance in terms of chemical stability, rate capability, storage life and cycle life.

One of atomic layer deposition, molecular layer deposition or a combination of atomic and molecular layer depositions can be utilized to apply electrically and/or ionically conductive, organic-inorganic hybrid polymer coatings on $Li_4Ti_5O_{12}$ powders. The one atomic layer deposition, molecular layer deposition or a combination of atomic and molecular layer depositions can be by conducted in a fluidized bed reactor. The organic-inorganic hybrid polymer coating can comprise a Lithium-doped or lithiated poly(zinc glycol), a zincone, a Lithium-doped poly(aluminum glycol), or alucone. It can be appreciated that the lithiated zincone and alucone are highly ionic and electronic conductive. The zincone can be represented by the following chemical formula: $(-O-Zn-O-C_2H_4-)_n$, where n is commonly from about 1 to about 1,000, more commonly from about 1 to about 100, or even more commonly from about 1 to about 10. The alucone can be represented by the following chemical formula: $(-O-Al-O-C_2H_4)_m$, where m is typically from about 1 to about 1,000, more typically from about 1 to about 100, or even more typically from about 1 to about 10.

In some embodiments, the lithium-doped polymer/solid electrolyte can comprise a lithium-doped titanicone. The titanicone is typically represented by the chemical formula $(Ti-O-CH_2-CH_2-O-)_x$ when using an ethylene glycol precursor or $(Ti-O-CH_2-CHOH-CH_2-O-)_x$ when using a glycerol precursor, where x is usually from about 1 to about 1,000, more usually from about 1 to about 100, or even more usually from about 1 to about 10.

$Li_4Ti_5O_{12}/LiNi_{0.5}Mn_{1.5}O_4$ Cells Long-Term Near Zero-Volt Storage Capability An investigation was conducted by a series of short-term, zero and/or near zero-volt discharge and storage test schemes. $Li_4Ti_5O_{12}/LiNi_{0.5}Mn_{1.5}O_4$ Lithium-ion full cells were cycled once between about 2 and about 3.5V for every five-day storage period, at open circuit, followed by discharge to about zero or near-zero (low) voltage. These cells were discharged to various low voltage endpoints and then monitored during rest, that is at open circuit; without an applied cell discharge current. The $Li_4Ti_5O_{12}/LiNi_{0.5}Mn_{1.5}O_4$ full cells were evaluated at about room temperature, regulated at about 23±0.5 degrees Celsius. After each five-day storage period at about zero volts, the cells were charged and discharged once at about C/2, between about 2 and about 3.5 volts.

Figure 6:
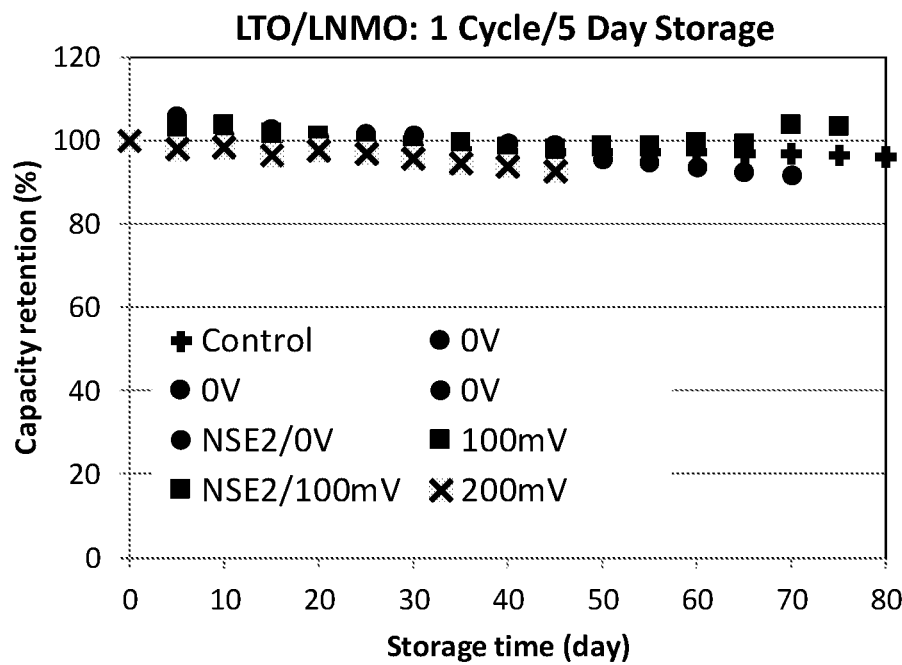
FIG. 6 depicts full cell capacity retention vs. storage time following discharged to various near zero-volt voltages for full cells according to some embodiments of the present disclosure.

FIG. 6 depicts capacity retention versus storage time for $Li_4Ti_5O_{12}/LiNi_{0.5}Mn_{1.5}O_4$ full cells, following discharge to various low voltages (that is at voltages of about zero volts), as indicated. The full cells maintained mostly their initial capacity values with minimal loss after up to cumulative of about 75-day storage at about zero volts. The capacity retention of the zero and/or near zero-volt stored cells was comparable to a control cell, that is a cell cycled without storage at zero and/or about zero volts, with a cycle number coincident with every five storage days on the x-axis. The observed data were consistent with prior art technology demonstrations, that is, resilient to about zero and/or near zero-volt storage.

The $Li_4Ti_5O_{12}/LiNi_{0.5}Mn_{1.5}O_4$ Lithium-ion full cells were also evaluate when cycled once between about 2 and about 3.5V for every thirty-day storage period, at open circuit, following discharge to zero and/or about near zero (low) voltages. The cells were discharged to various low voltage endpoints and then monitored during rest, that is, open circuit; without an applied cell discharge current. The $Li_4Ti_5O_{12}/LiNi_{0.5}Mn_{1.5}O_4$ Lithium-ion full cells were evaluated at room temperature, regulated at about 23±0.5 degrees Celsius. After each thirty-day storage period at about zero volts, the cells were charged and discharged once at about C/2, between about 2 to about 3.5 volts.

Figure 7:
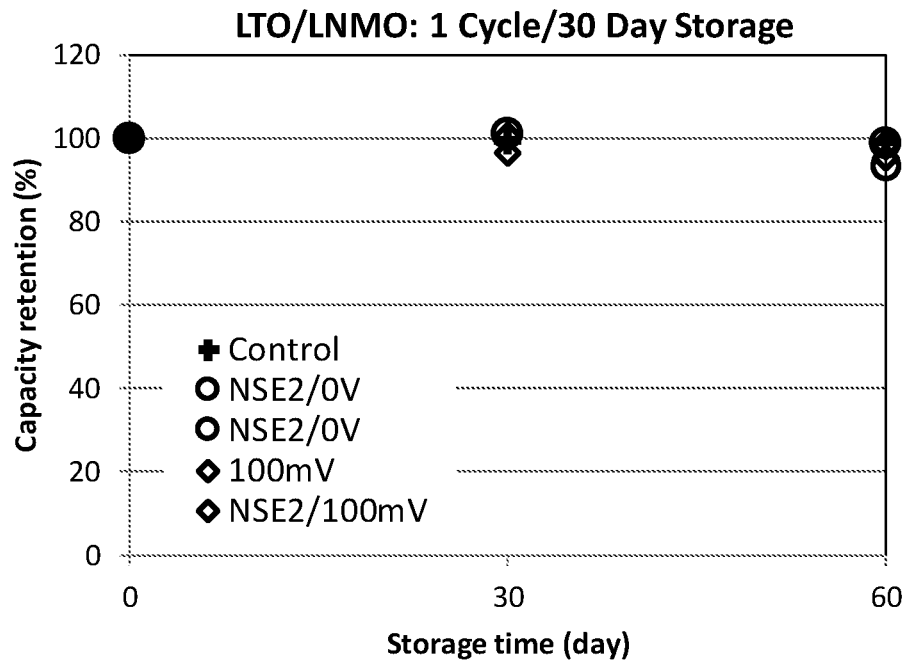
FIG. 7 depicts full cell capacity retention vs. storage time following discharged to various near zero-volt voltages for full cells according to some embodiments of the present disclosure.

FIG. 7 depicts capacity retention versus storage time for $Li_4Ti_5O_{12}/LiNi_{0.5}Mn_{1.5}O_4$ full cells, following discharge to various low voltages (this voltages at about zero volts), as indicated. The $Li_4Ti_5O_{12}/LiNi_{0.5}Mn_{1.5}O_4$ Lithium-ion full cells were cycled once between from about 2 to about 3.5V for every thirty-day storage period, at open circuit, following discharge to about zero volts and/or about near zero-volts. The full cells displayed negligible capacity loss after the first 60-day storage at about zero volts. The capacity retention of the zero and/or near zero-volt stored cells was comparable to a control cell (that is, a cell cycled without storage at zero and/or about near zero-volts), with a cycle number coincident with every 30 storage days on the x-axis. The observed data were consistent with prior art and 1 cycle/5 day technology demonstrations, that is, resilient to about zero and/or near zero-volt storage.

Three-Electrode Study

The three-electrode study consisted of a lithium reference electrode to monitor individual electrode potentials, in addition to the full cell voltage. The objective of this study was to gain an understanding of individual electrode potentials corresponding to the full cell voltages at zero and/or about near volts.

Figure 8:
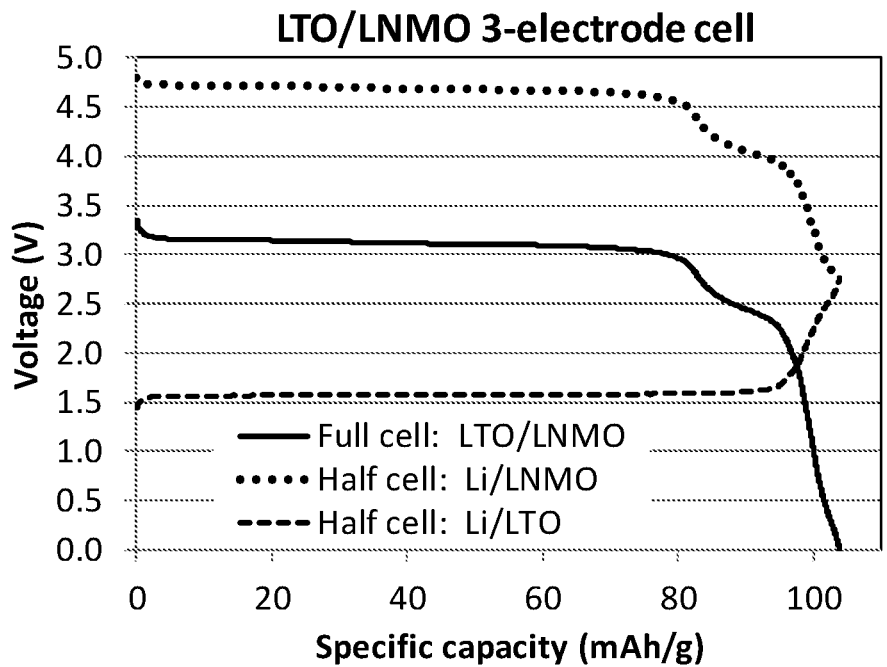
FIG. 8 depicts electrode cell voltage profiles according some embodiments of the present disclosure.

FIG. 8 depicts a cell voltage profile, $V_{cell}$, of a $Li_4Ti_5O_{12}/LiNi_{0.5}Mn_{1.5}O_4$ full cell and corresponding $LiNi_{0.5}Mn_{1.5}O_4$ and $Li_4Ti_5O_{12}$ potential profiles versus the lithium reference electrode, $P_{LiNi0.5Mn1.5O4}$ and $P_{Li4Ti5O12}$, respectively. A clear correspondence for the full cell voltage equal to the potential difference between the cathode and the anode potential, that is, $V_{cell}=P_{LiNi0.5Mn1.5O4}-P_{Li4Ti5O12}$, was observed. Since the anode and the cathode each possess (substantially) flat potentials, the cell voltage is correspondingly substantially flat during most of the capacity delivery. Typically, the $Li_4Ti_5O_{12}/LiNi_{0.5}Mn_{1.5}O_4$ full cell is cycled between about 2 to about 3.5 volts. An inverse relationship for the $LiNi_{0.5}Mn_{1.5}O_4$ and $Li_4Ti_5O_{12}$ potentials was observed, when the full cell was discharged from about two volts to about zero volts. At about near zero-volt, the $LiNi_{0.5}Mn_{1.5}O_4$ and $Li_4Ti_5O_{12}$ potentials are equal, at about 2.76 volts versus the lithium reference electrode.

Table 1 presents individual electrode potentials versus the lithium reference electrode, that is, the $Li_4Ti_5O_{12}$ and $LiNi_{0.5}Mn_{1.5}O_4$ electrodes, respectively. This corresponded to discrete $Li_4Ti_5O_{12}/LiNi_{0.5}Mn_{1.5}O_4$ full cell voltages at about zero and/or about near zero-volts. Illustrative (and representative) of $Li/Li_4Ti_5O_{12}$ and $Li/LiNi_{0.5}Mn_{1.5}O_4$ potentials were included.

TABLE 1

| $Li_4Ti_5O_{12}/LiNi_{0.5}Mn_{1.5}O_4$ | $LiNi_{0.5}Mn_{1.5}O_4$ | $Li_4Ti_5O_{12}$ |
| --- | --- | --- |
| 0.00 | 2.76 | 2.76 |
| 0.05 | 2.77 | 2.67 |
| 0.10 | 2.80 | 2.60 |
| 0.30 | 2.84 | 2.54 |
| 0.41 | 2.90 | 2.49 |
| 0.51 | 2.96 | 2.45 |

$Li/LiNi_{0.5}Mn_{1.5}O_4$ Half-Cell Storage Study

The objective was to investigate the individual electrode storage behavior at potentials corresponding to $Li_4Ti_5O_{12}/LiNi_{0.5}Mn_{1.5}O_4$ full cell voltages at about zero volts and/or at about near zero-volts. $LiNi_{0.5}Mn_{1.5}O_4$ and $Li_4Ti_5O_{12}$ half-cells versus a lithium metal reference electrode were prepared.

$Li/LiNi_{0.5}Mn_{1.5}O_4$ half-cells were cycled once at about 3 to about 4.95 volts for every five-day storage period, following discharge to about 2.76 volts and 2.84 volts corresponding to the full cell voltage of about zero and about 0.3 volts, respectively; referencing Table 1. The $Li/LiNi_{0.5}Mn_{1.5}O_4$ half-cells were discharged to various low voltage endpoints at about zero and/or near about zero volts and monitored at rest (that is, at open circuit, without cell discharge current application). Hence, $Li/LiNi_{0.5}Mn_{1.5}O_4$ half-cells were stored at relatively lower voltages at about zero and/or near about zero volts than the nominal cutoff voltage of about three volts.

Figure 9:
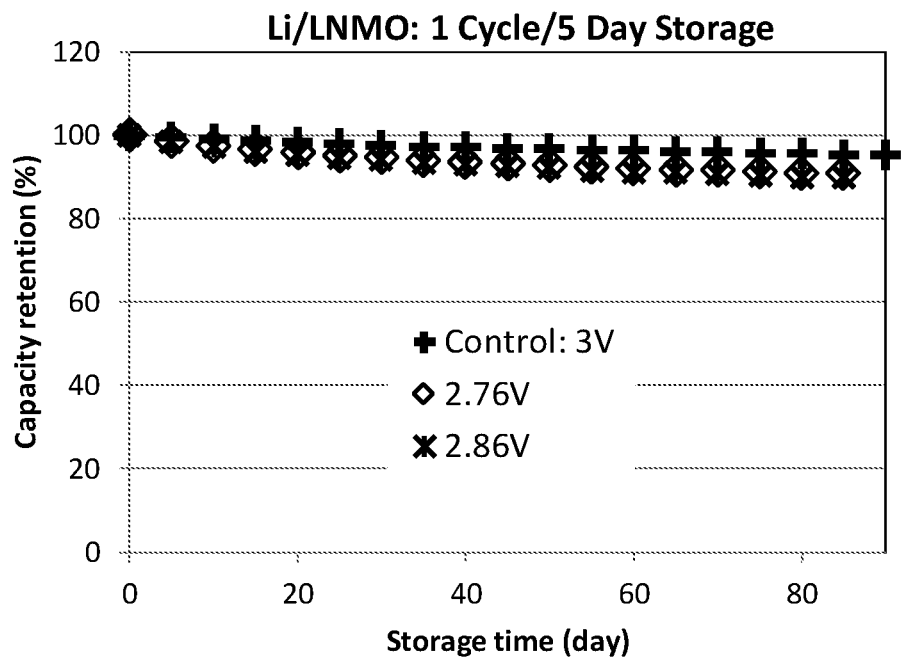
FIG. 9 depicts capacity retention versus storage time according to some embodiments of the present disclosure.

FIG. 9 depicts capacity retention versus storage time, following discharge to the voltages therein indicated. The $Li/LiNi_{0.5}Mn_{1.5}O_4$ half-cells maintained about 90% of their initial capacities after about 85-day storage. The control cell was cycled from about 3 to about 4.95 volts without low voltage storage. The $Li/LiNi_{0.5}Mn_{1.5}O_4$ half-cell storage results are consistent with the full cell at about zero and/or near about zero-volt storage results.

$Li/Li_4Ti_5O_{12}$ Half-Cell Storage Study $Li/Li_4Ti_5O_{12}$ half-cells were cycled once from about 1 and about 2V for every five-day storage period, following a charge of about 2.76, about 2.67, about 2.54 and about 2.45 volts corresponding to the $Li_4Ti_5O_{12}/LiNi_{0.5}Mn_{1.5}O_4$ full cell voltage at about 0, about 0.1, about 0.3 and about 0.5 volts, respectively; (reference Table 1). $Li/Li_4Ti_5O_{12}$ cells were charged to high voltage endpoints and monitored at rest, at about open circuit, without cell charge application. Hence, Li/Li$_4$Ti$_5$O$_{12}$ half-cells were stored at relatively higher voltages than the nominal high 2-volt cutoff voltage.

Figure 10:
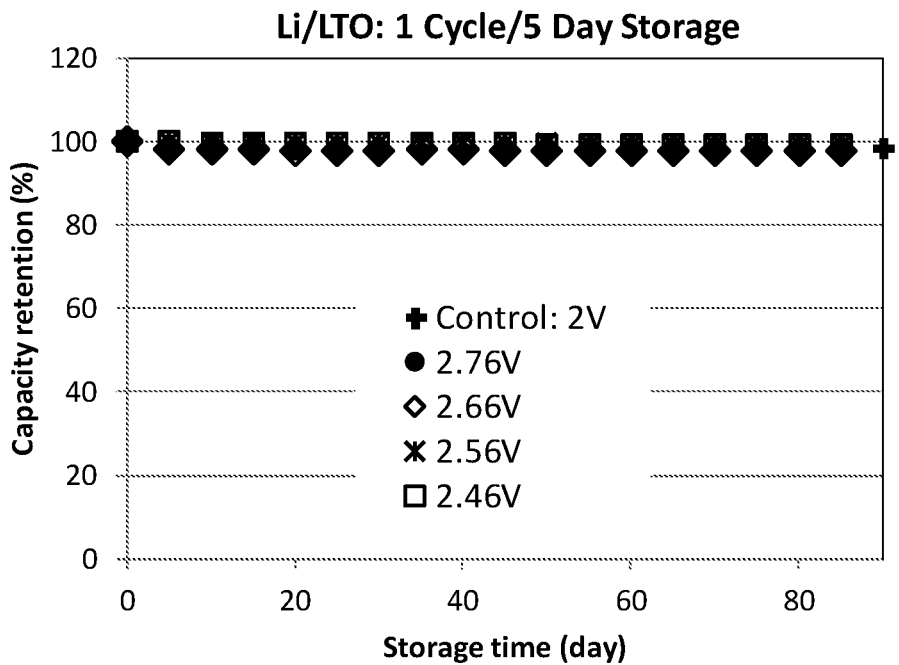
FIG. 10 depicts capacity retention versus storage time for half-cells according to some embodiments of the present disclosure.

FIG. 10 depicts capacity retention verses storage time, following charge to the indicated, high voltages. The Li/Li$_4$Ti$_5$O$_{12}$ half-cells maintained about 99% or more of their initial capacities after about 85-day storage. The results of the Li/Li$_4$Ti$_5$O$_{12}$ half-cell storage are consistent with the full cell about zero and/or near about zero-volt storage results.

High Voltage, Nonflammable Electrolyte Evaluation

Table 2 summarizes three new electrolyte formulations. NSE1 and NSE2 contain high voltage stable, nonflammable, fluorinated carbonate solvents, and NSE3 contains a tris (trimethylsilyl) phosphite additive.

TABLE 2

| Electrolyte | Electrolyte Composition |
| --- | --- |
| Control (Prior Art) | 1M LiPF$_6$ in EC:DMC 1:1 vol % |
| NSE1 | 1M LiPF$_6$ in EC:DMC:FDEC 1:2:2 vol % |
| NSE2 | 1M LiPF$_6$ in EC:DMC:TFPC 1:2:2 vol % |
| NSE3 | 1M LiPF$_6$ in EC:DMC 1:4 vol % (100 g):TMSPi (1 g) |

EC = ethylene carbonate;
DMC = dimethyl carbonate
FDEC = bis (2,2,2-trifluoroethyl) carbonate
TFPC = 3,3,3-trifluoropropylene carbonate
TMSPi = Tris(trimethylsilyl) phosphite.

Figure 11:
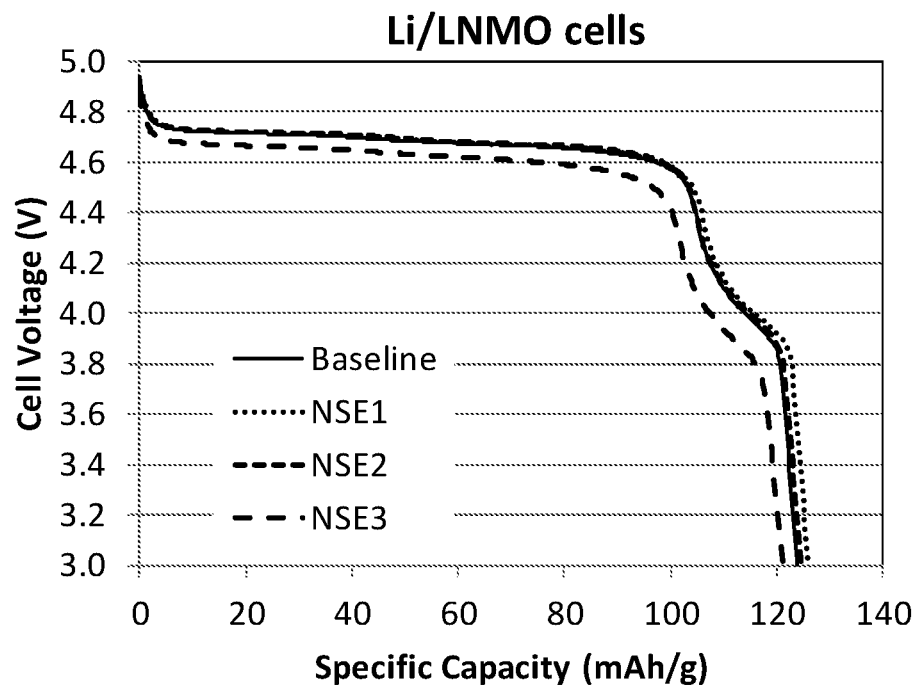
FIG. 11 depicts voltage profiles of cells with electrolyte formulations according to some embodiments of the present disclosure.

High Voltage, Nonflammable Electrolyte Evaluation in LiNi$_{0.5}$Mn$_{1.5}$O$_4$ Cells FIG. 11 depicts discharge voltage profiles of Li/LiNi$_{0.5}$Mn$_{1.5}$O$_4$ cells with the formulated electrolytes indicated, cycled between about 3 and about 4.6 volts at C/4 rate at room temperature. The Li/LiNi$_{0.5}$Mn$_{1.5}$O$_4$ cells with the three new electrolytes demonstrated excellent discharge capacities. Electrolyte NSE3 was comparable to the control electrolyte, and electrolytes NSE1 and NSE2 were slightly better than the control electrolyte.

Figure 12:
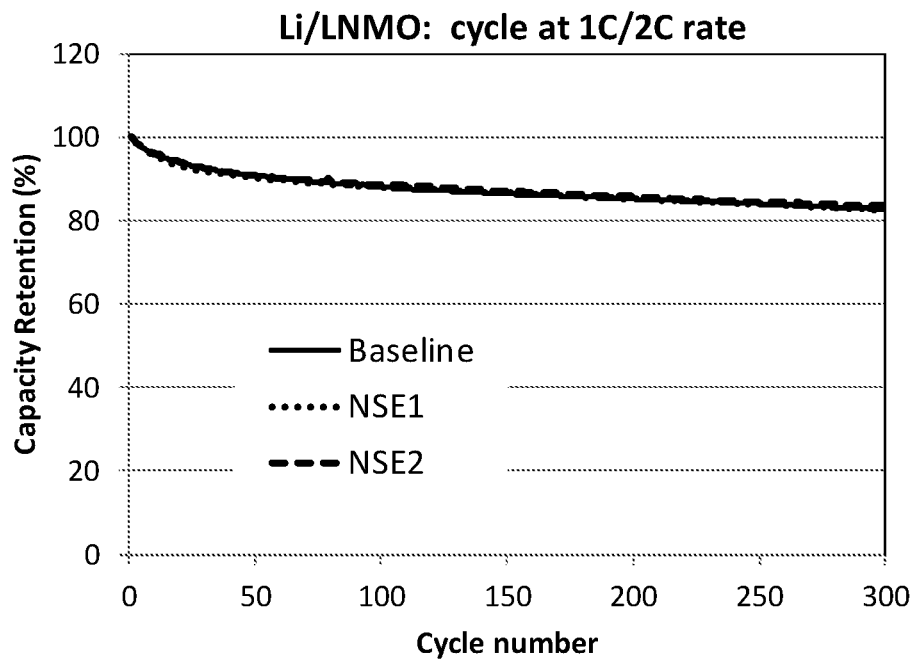
FIG. 12 depicts capacity retention versus cycle number data of cells with electrolyte formulations according to some embodiments of the present disclosure.

FIG. 12 shows discharge capacity retention versus cycle number for Li/LiNi$_{0.5}$Mn$_{1.5}$O$_4$ cells with the formulated electrolytes indicated. The Li/LiNi$_{0.5}$Mn$_{1.5}$O$_4$ cells with NSE1 and NSE2 of the electrolytes demonstrated excellent cycle life performance, with capacity retentions of about 83% or greater after about 300 cycles, which are comparable with the control electrolyte. These successful performance demonstrations of the high voltage, nonflammable electrolytes in Li/LiNi$_{0.5}$Mn$_{1.5}$O$_4$ cells further enhance near zero-volt battery technology to meet high rate, long cycle life, and safety requirements.

Figure 13A:
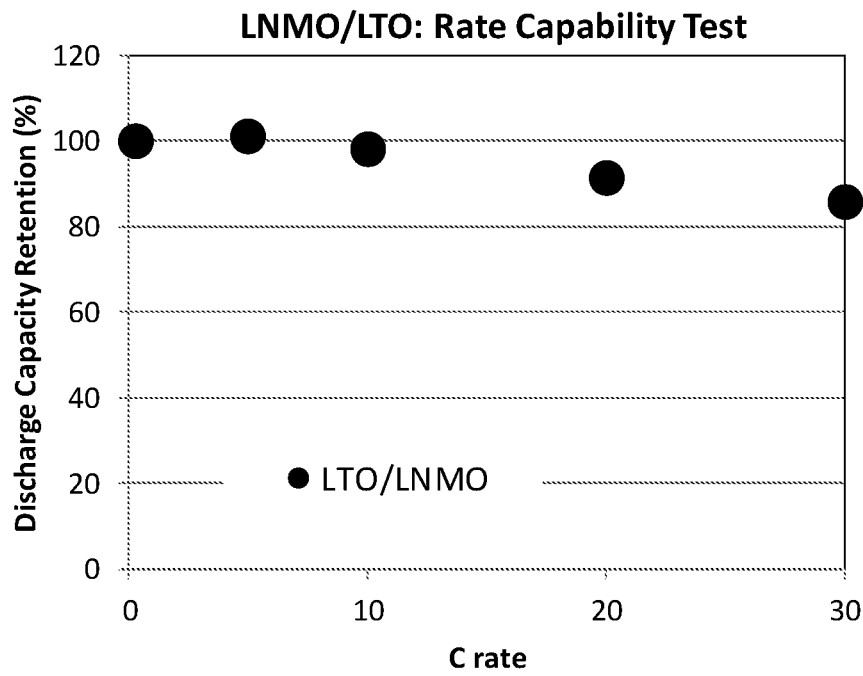
FIG. 13A depicts discharge capability tests for cells according to some embodiments of the present disclosure.
Figure 13B:
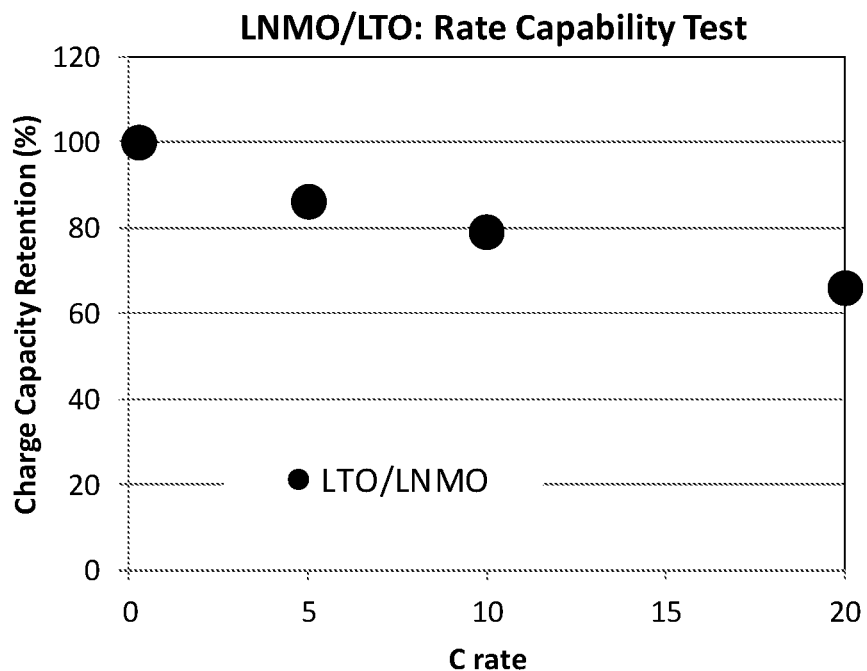
FIG. 13B depicts charge rate capability tests for ells according to some embodiments of the present disclosure.

Li$_4$Ti$_5$O$_{12}$/LiNi$_{0.5}$Mn$_{1.5}$O$_4$ Full Cell Electrochemical Performance Demonstration FIG. 13 depicts charge and discharge rate capability test data for Li$_4$Ti$_5$O$_{12}$/LiNi$_{0.5}$Mn$_{1.5}$O$_4$ cells. The Li$_4$Ti$_5$O$_{12}$/LiNi$_{0.5}$Mn$_{1.5}$O$_4$ cells were cycled between about 2.0 to about 3.5V at room temperature. The charge and discharge capacity retention at various C rates is referenced to a low rate of about C/4, respectively. The Li$_4$Ti$_5$O$_{12}$/LiNi$_{0.5}$Mn$_{1.5}$O$_4$ full cells demonstrated excellent rate capability, of about 86% or more discharge capacity retention at about a 30 C rate and about 80% charge capacity retention at about a 10 C rate. Such full cell rate capability enables the near zero-volt batteries of the present disclosure to meet high C rate cycling and discharge pulse requirements for a variety of cell applications not met by cells of prior art.

Figure 14:
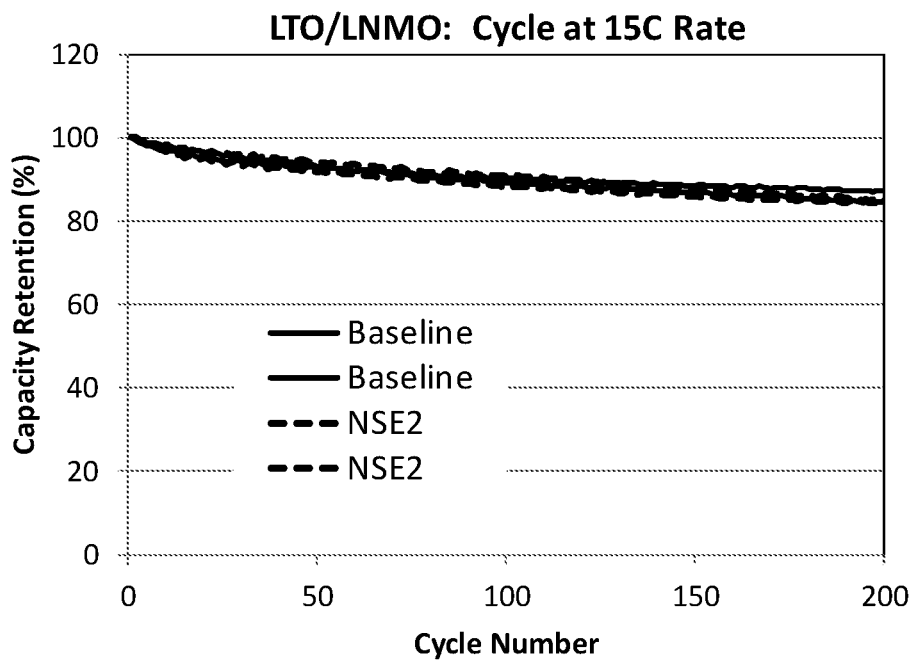
FIG. 14 depicts discharge capacity retention versus cycle number for cells cycled at 15 C rate according to some embodiments of the present disclosure.

FIG. 14 depicts discharge capacity retention versus cycle number for Li/LiNi$_{0.5}$Mn$_{1.5}$O$_4$ cells. The Li$_4$Ti$_5$O$_{12}$/LiNi$_{0.5}$Mn$_{1.5}$O$_4$ cells were cycled between about 2.0 to about 3.5V, at a 15 C rate for charge and discharge at room temperature. The Li$_4$Ti$_5$O$_{12}$/LiNi$_{0.5}$Mn$_{1.5}$O$_4$ full cells, with high rate electrodes, demonstrated an excellent high C rate of about 15 C rate cycle stability, with capacity retention of about 85% or more after about 200 cycles. The nonflammable fluorinated carbonate-based electrolyte, NSE2, showed comparable high rate cycle life performance with the control electrolyte.

A number of variations and modifications of the disclosure can be used. It would be possible to provide for some features of the disclosure without providing others. The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. An electrode for an electrochemical energy storage device, comprising:
   a current collector; and
   an anode active material positioned on the current collector, wherein the anode active material comprises a lithium titanium oxide, wherein the anode active material is coated with an organic-inorganic hybrid polymer, wherein the organic-inorganic hybrid polymer comprises repeating metal glycol or metal triol units, wherein the metal in the organic-inorganic hybrid polymer comprises zinc, aluminum, or titanium.

2. The electrode of claim 1, wherein the lithium titanium oxide is $Li_4Ti_5O_{12}$.

3. The electrode of claim 1, wherein the organic-inorganic hybrid polymer is selected from the group consisting of: a poly(zinc glycol), a mixture of ZnO and a poly(zinc glycol), a lithium-doped poly(zinc glycol), a poly(aluminum glycol), a lithium-doped poly(aluminum glycol), a poly(titanium glycol), a lithium-doped poly(titanium glycol), a poly(titanium propanol), a lithium-doped poly(titanium propanol), and combinations thereof.

4. The electrode of claim 1, wherein the lithium titanium oxide is in a form of a powder.

5. The electrode of claim 1, wherein the current collector comprises an aluminum foil.

6. An electrochemical energy storage device, comprising:
an anode comprising an anode current collector and an anode active material, wherein the anode active material comprises $Li_4Ti_5O_{12}$, wherein the anode active material is coated with an organic-inorganic hybrid polymer comprising repeating metal glycol or metal triol units, wherein the metal is selected from the group consisting of zinc, aluminum, and titanium;
a cathode comprising a cathode current collector and a cathode active material; and
an electrolyte.

7. The electrochemical energy storage device of claim 6, wherein the organic-inorganic hybrid polymer is selected from the group consisting of: a poly(zinc glycol), a mixture of ZnO and a poly(zinc glycol), a lithium-doped poly(zinc glycol), a poly(aluminum glycol), a lithium-doped poly(aluminum glycol), a poly(titanium glycol), a lithium-doped poly(titanium glycol), a poly(titanium propanol), a lithium-doped poly(titanium propanol), and combinations thereof.

8. The electrochemical energy storage device of claim 6, wherein one or both of the anode current collector and the cathode current collector comprises an aluminum foil.

9. The electrochemical energy storage device of claim 6, wherein the cathode active material is selected from the group consisting of a lithium transition metal oxide, a lithium transition metal nitride, a lithium transition metal fluoride, a lithium transition metal sulfide, a lithium transition metal phosphate, and mixtures thereof.

10. The electrochemical energy storage device of claim 6, wherein the electrolyte comprises two or more carbonate solvents selected from the group consisting of ethylene carbonate, dimethyl carbonate, bis (2,2,2-trifluoroethyl) carbonate, and bis (3,3,3-trifluoropropyl) carbonate.

11. The electrochemical energy storage device of claim 10, wherein the electrolyte further comprises an electrolyte salt selected from the group consisting of $LiPF_6$, tris(trimethylsilyl) phosphite, $LiBF_4$, and combinations thereof.

12. The electrochemical energy storage device of claim 6, further comprising a separator comprising one or more of a polymeric material, a fibrous material, or a naturally occurring material, wherein the electrolyte is in ionic contact with the separator.

13. The electrochemical energy storage device of claim 6, wherein the electrolyte comprises one or both of a sulfone solvent and a carbonate solvent.

14. The electrochemical energy storage device of claim 6, wherein the electrolyte comprises a sulfone solvent selected from the group consisting of ethylmethyl sulfone (EMS), 2,2,2-trifluoroethylmethyl sulfone, ethyl-sec-butyl sulfone, and a mixture thereof.

15. The electrochemical energy storage device of claim 6, wherein the organic-inorganic hybrid polymer encapsulates the anode active material.

16. An electrochemical energy storage device, comprising:
an anode comprising an anode current collector and an anode active material, wherein the anode active material comprises a lithium titanium oxide, wherein the anode active material is coated with an organic-inorganic hybrid polymer,
a cathode comprising a cathode current collector and a cathode active material, wherein the cathode active material comprises a lithium manganese oxide;
an electrolyte comprising two or more carbonate solvents; and
a separator,
wherein the organic-inorganic hybrid polymer is selected from the group consisting of: a poly(zinc glycol), a mixture of ZnO and a poly(zinc glycol), a lithium-doped poly(zinc glycol), a poly(aluminum glycol), a lithium-doped poly(aluminum glycol), a poly(titanium glycol), a lithium-doped poly(titanium glycol), a poly (titanium propanol), a lithium-doped poly(titanium propanol), and combinations thereof.

17. The electrochemical energy storage device of claim 16, wherein the two or more carbonate solvents are selected from the group consisting of ethylene carbonate, dimethyl carbonate, bis (2,2,2-trifluoroethyl) carbonate, and bis (3,3, 3-trifluoropropyl) carbonate.

18. The electrochemical energy storage device of claim 16, wherein the lithium titanium oxide comprises $Li_4Ti_5O_{12}$, wherein the lithium manganese oxide is $LiNi_{0.5}Mn_{1.5}O_4$, and wherein one or both of the anode current collector and the cathode current collector comprises an aluminum foil.

19. The electrochemical energy storage device of claim 16, wherein the organic-inorganic hybrid polymer encapsulates the anode active material.

20. The electrochemical energy storage device of claim 16, wherein the electrochemical energy storage device is selected from the group consisting of an electrochemical cell and a battery, wherein the electrochemical energy storage device is capable of long-term storage at about zero volts.

21. The electrochemical energy storage device of claim 16, wherein the electrolyte comprises a sulfone solvent selected from the group consisting of ethylmethyl sulfone (EMS), 2,2,2-trifluoroethylmethyl sulfone, ethyl-sec-butyl sulfone, and a mixture thereof.

* * * * *